United States Patent [19]

Pierret et al.

[11] Patent Number: 5,079,496

[45] Date of Patent: Jan. 7, 1992

[54] MULTIFUNCTION REGULATOR SYNCHRONIZED TO AN ALTERNATOR

[75] Inventors: Jean-Marie Pierret, Paris; Didier Michel, La Queue en Brie, both of France

[73] Assignee: Equipements Electriques Moteur, Creteil, France

[21] Appl. No.: 314,811

[22] Filed: Feb. 22, 1989

[30] Foreign Application Priority Data

Feb. 23, 1988 [FR] France ............................... 88 02139
Apr. 12, 1988 [FR] France ............................... 88 04819
Jan. 11, 1989 [FR] France ............................... 89 00267

[51] Int. Cl.⁵ ............................................. H02P 9/30
[52] U.S. Cl. ...................................... 322/28; 322/99
[58] Field of Search ................. 322/22, 24, 25, 27, 322/28, 99; 320/64, 68

[56] References Cited

U.S. PATENT DOCUMENTS

| | | | |
|---|---|---|---|
| 4,019,120 | 4/1977 | Fattic ........................... | 322/28 |
| 4,250,444 | 2/1981 | Iwaki et al. .................. | 322/28 |
| 4,275,344 | 6/1981 | Mori et al. ................... | 322/28 |
| 4,379,990 | 4/1983 | Sievers et al. ............... | 322/28 X |
| 4,409,539 | 10/1983 | Nordbrock et al. .......... | 322/28 |
| 4,471,287 | 9/1984 | Morishita et al. ............ | 322/99 |
| 4,560,916 | 12/1985 | Yoshiyuki et al. ........... | 320/64 X |
| 4,584,515 | 4/1986 | Edwards ...................... | 322/28 |

FOREIGN PATENT DOCUMENTS

| | | |
|---|---|---|
| 0009895 | 4/1980 | European Pat. Off. . |
| 1538530 | 3/1970 | Fed. Rep. of Germany . |
| 3438259 | 5/1985 | Fed. Rep. of Germany . |
| 563366 | 9/2969 | Fed. Rep. of Germany . |
| 2555834 | 5/1985 | France . |
| 2744499 | 4/1979 | Netherlands .................. 322/99 |
| 2052189 | 1/1981 | United Kingdom . |

Primary Examiner—Steven L. Stephan
Assistant Examiner—Kristine Peckman
Attorney, Agent, or Firm—Blakely, Sokoloff, Taylor & Zafman

[57] ABSTRACT

A plurifunction device for regulating the excitation voltage of an alternator for charging the battery of an automobile vehicle, comprising battery and alternator phase voltage inputs, an excitation regulation output and a terminal connected to an indicator lamp. It also includes field coil power excitation control circuit, a battery voltage sensing circuit connected to the battery voltage input to supply a signal indicating that an alternator-battery connection is broken and an excitation regulation signal related to the peak and average values of the battery voltage. An alternator phase voltage amplitude sensing circuit supplies a first sensing signal related to a first threshold value authorizing the establishing of an excitation current with a frequency and cyclic ratio imposed by an alternator phase voltage signal applied to the alternator phase voltage input to initiate cutting in of the alternator. A second sensing signal related to an intermediate second threshold value authorizes application of a full-field condition to the alternator during cutting in initiated by the first sensing signal. A third sensing signal related to a third threshold value near a battery charge regulation voltage indicates the alternator phase voltage amplitude for sensing faults relating to this amplitude. An alternator field coil excitation control and memory supply a signal authorizing the full-field condition during cutting in of the alternator. A timer for the field coil excitation control and memory is synchronized to the alternator rotation speed. The field coil excitation voltage is controlled by conditional control logic.

23 Claims, 13 Drawing Sheets

SINGLE-FUNCTION

MULTIFUNCTION

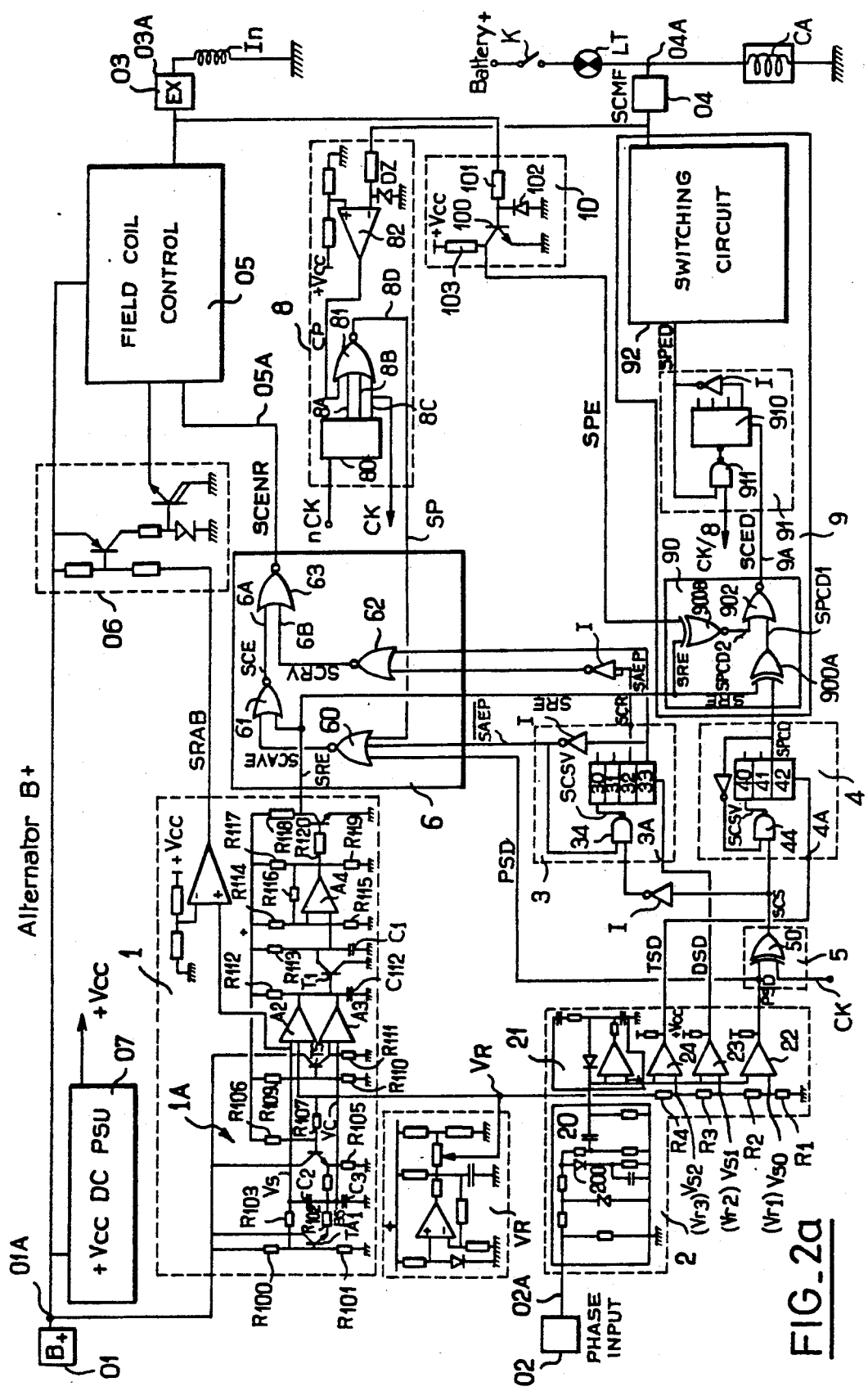
FIG._2a

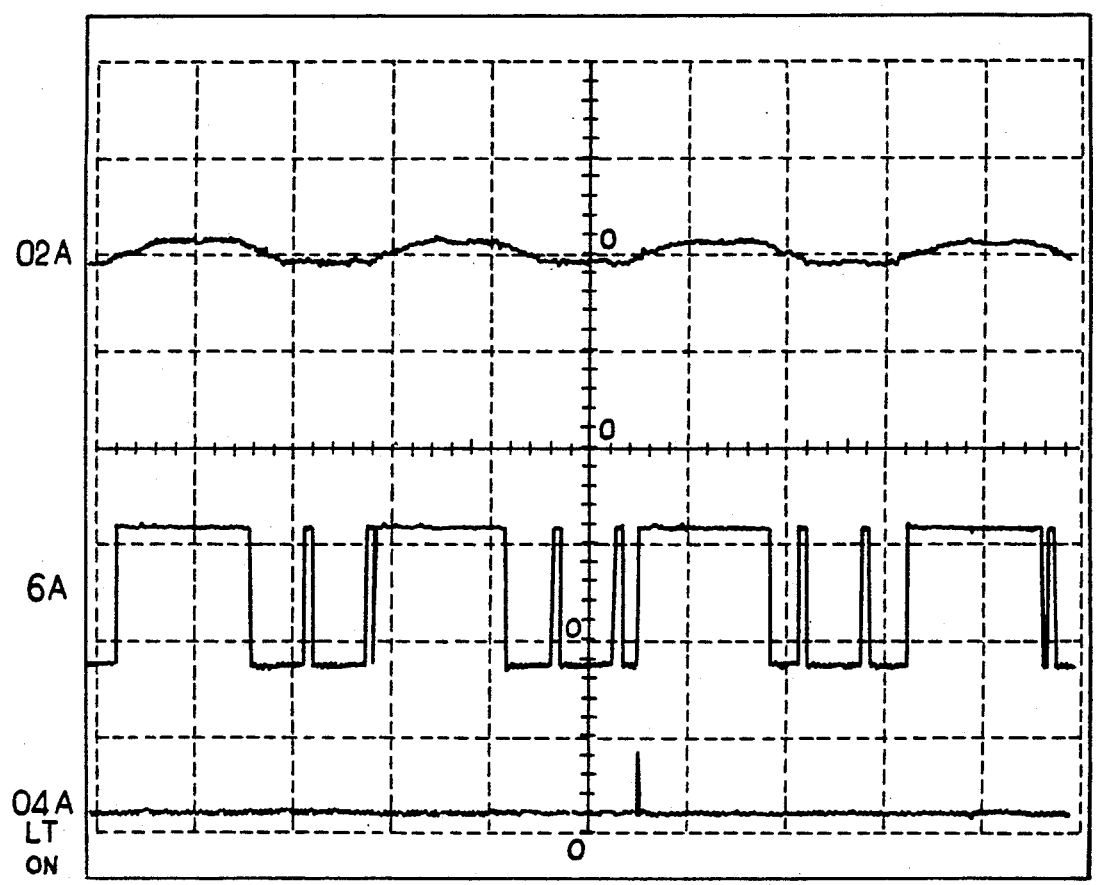
FIG_2e

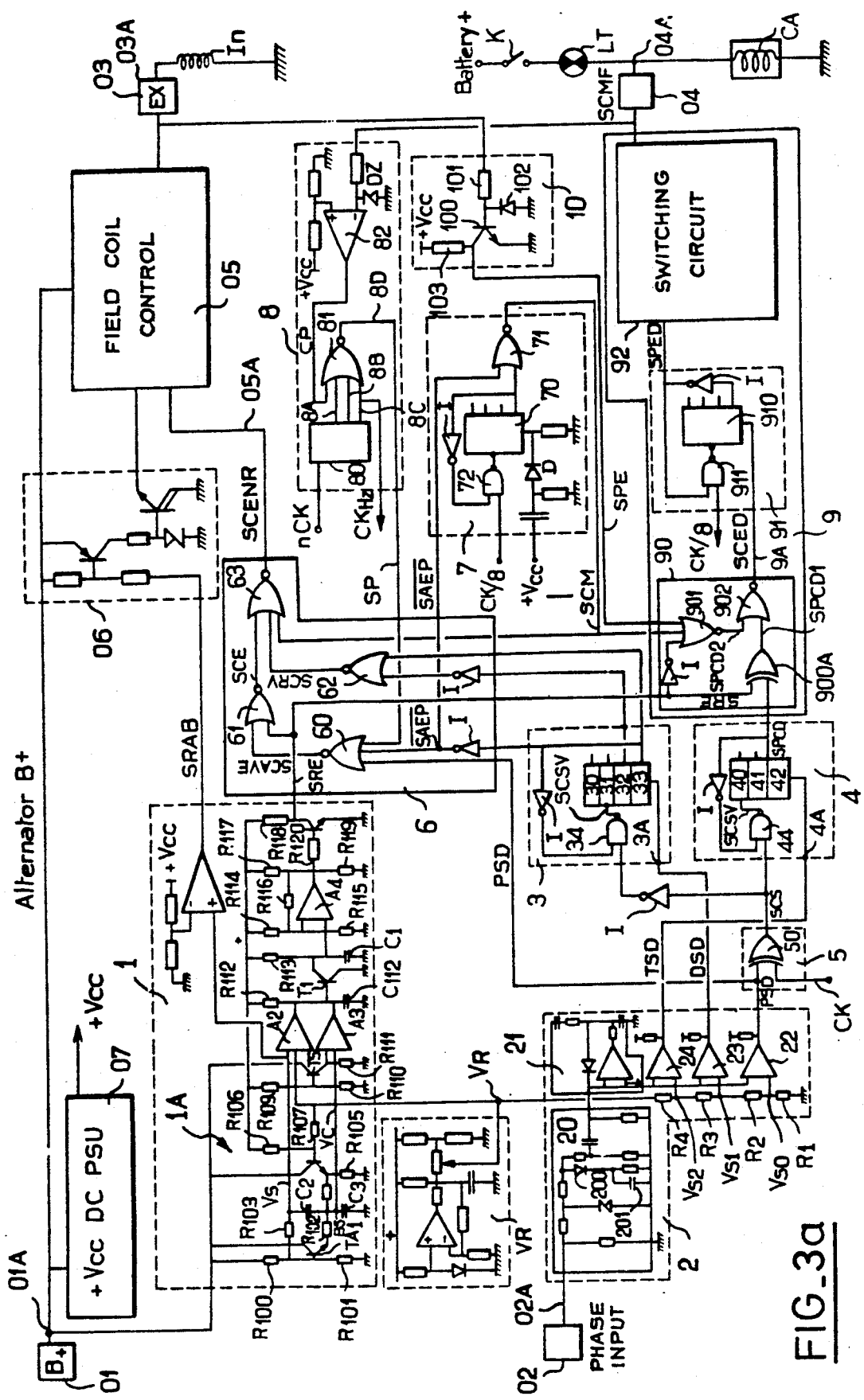
FIG_3a

FIG._3b
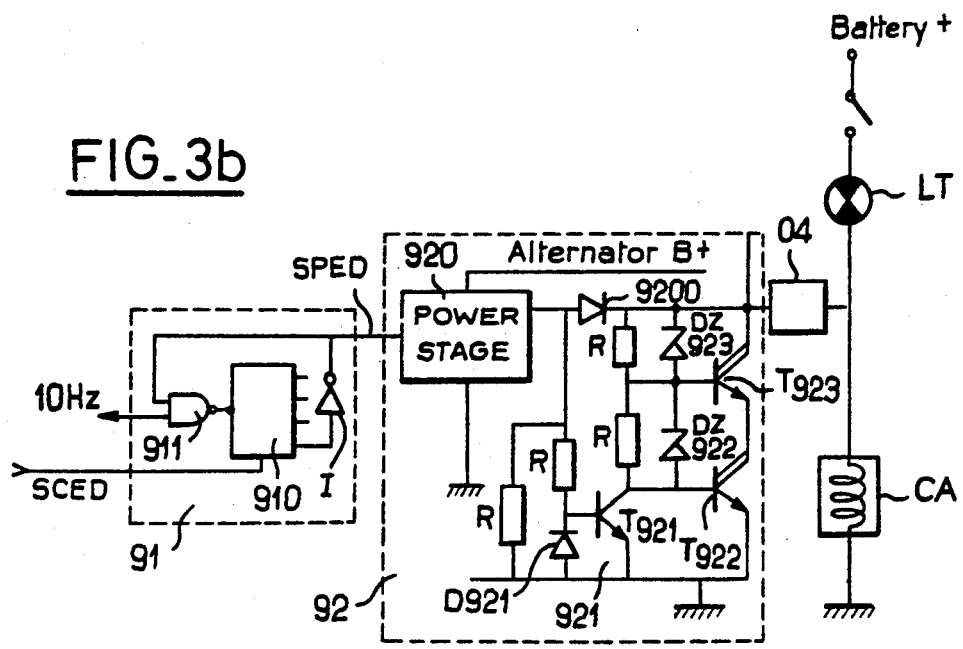
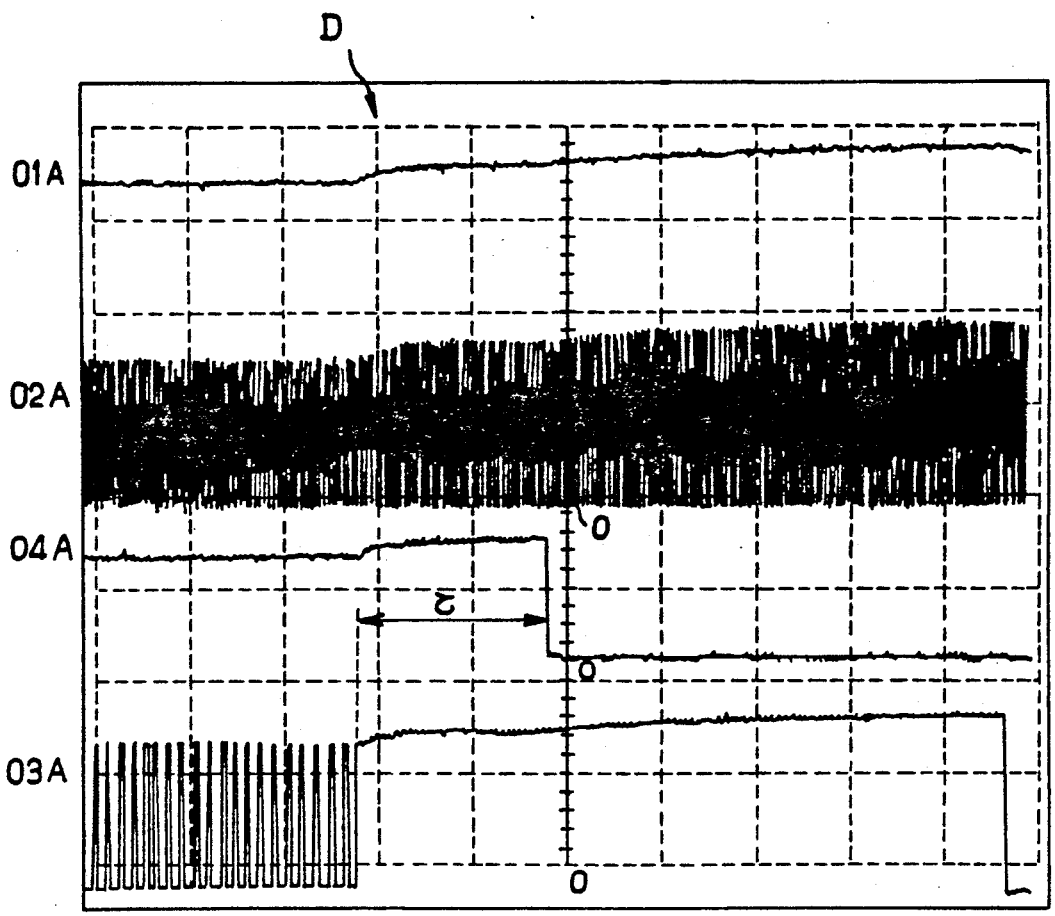
FIG._4  FIELD COIL IN FULL-FIELD FAULT CONDITION

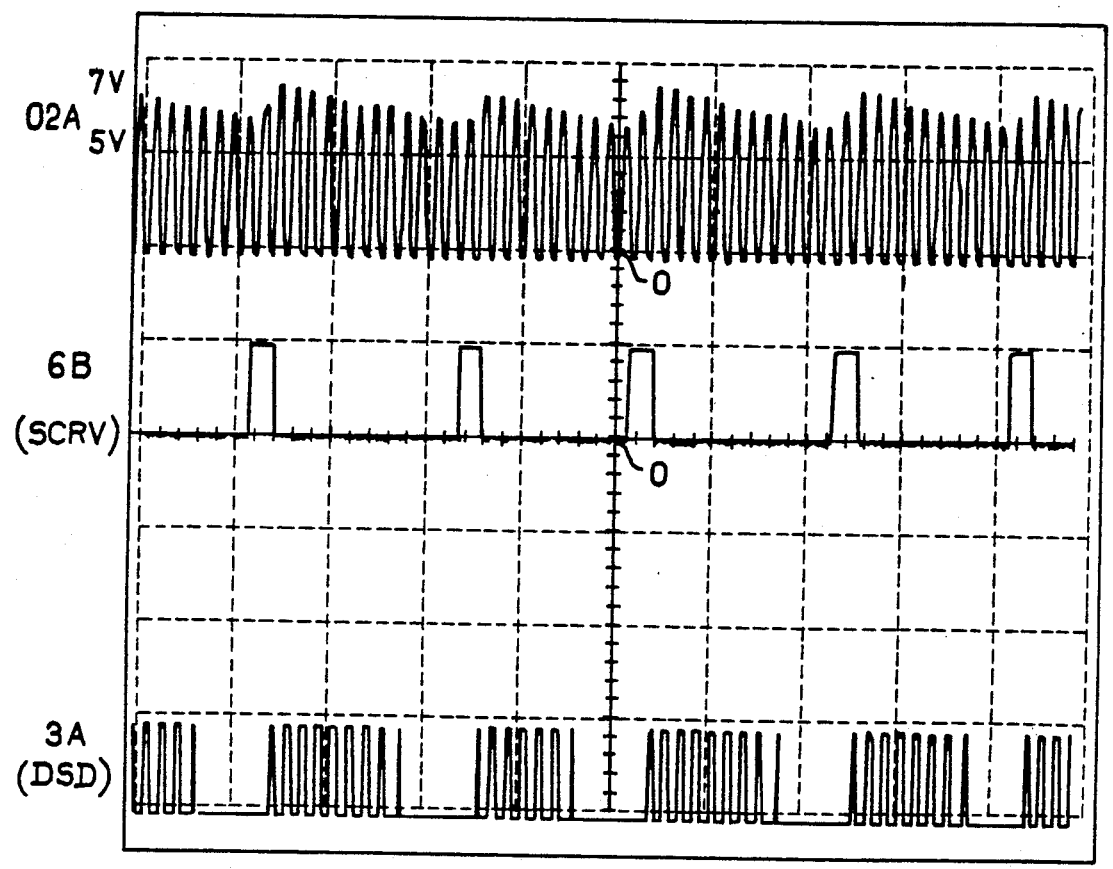
FIG_5b

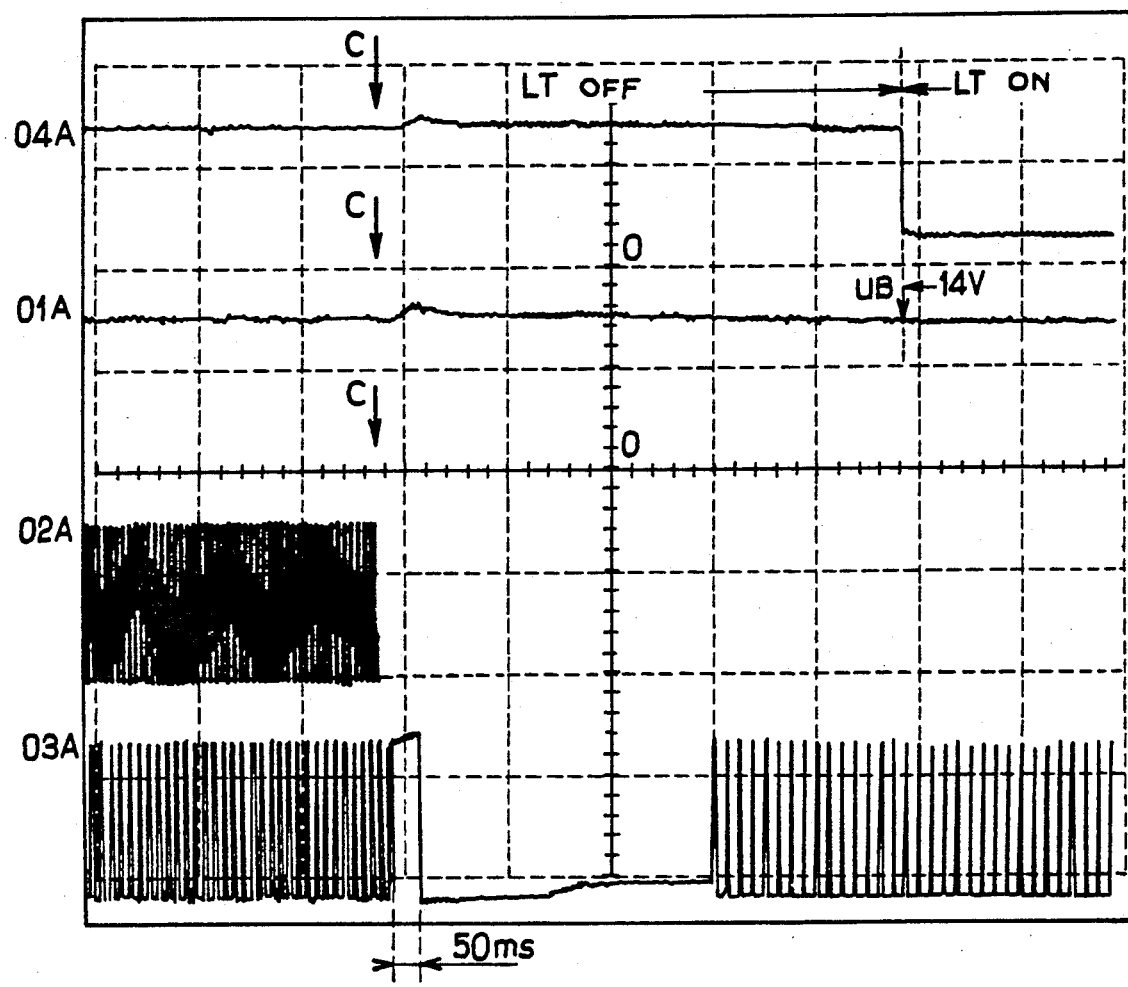
FIG_6a

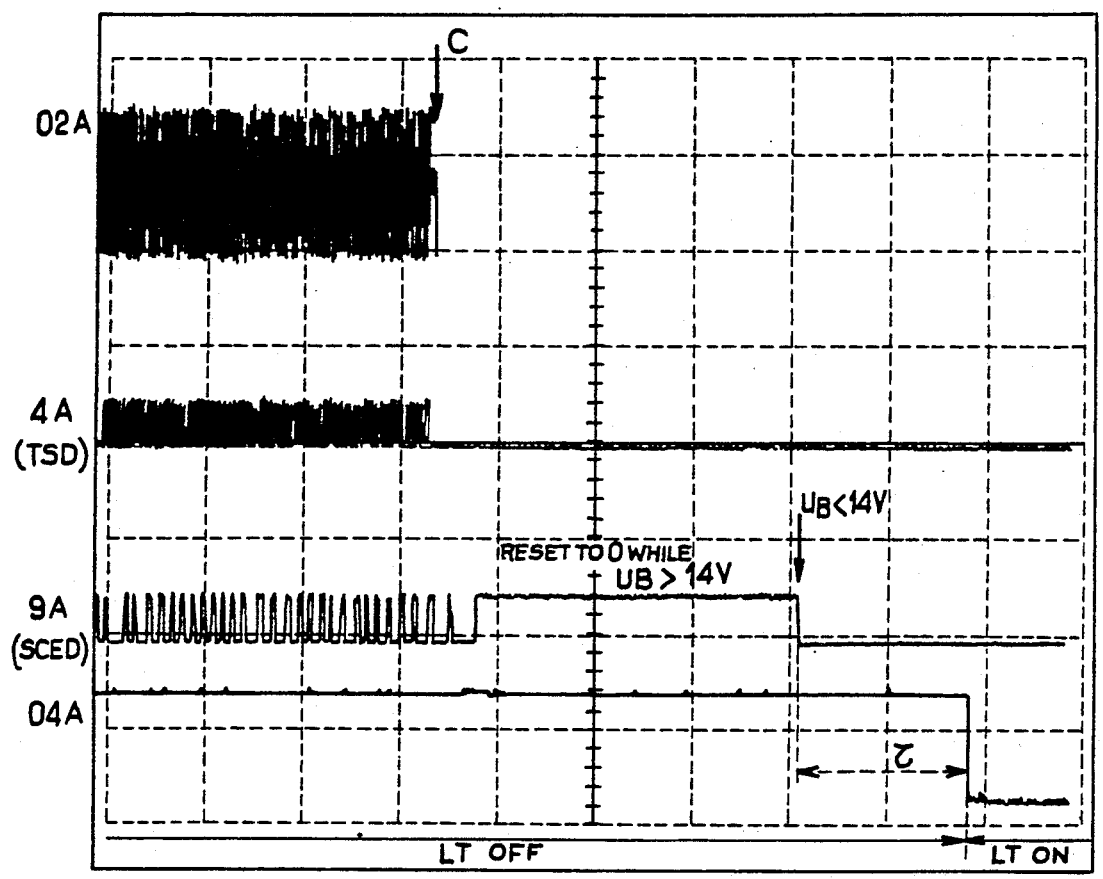
FIG_6b

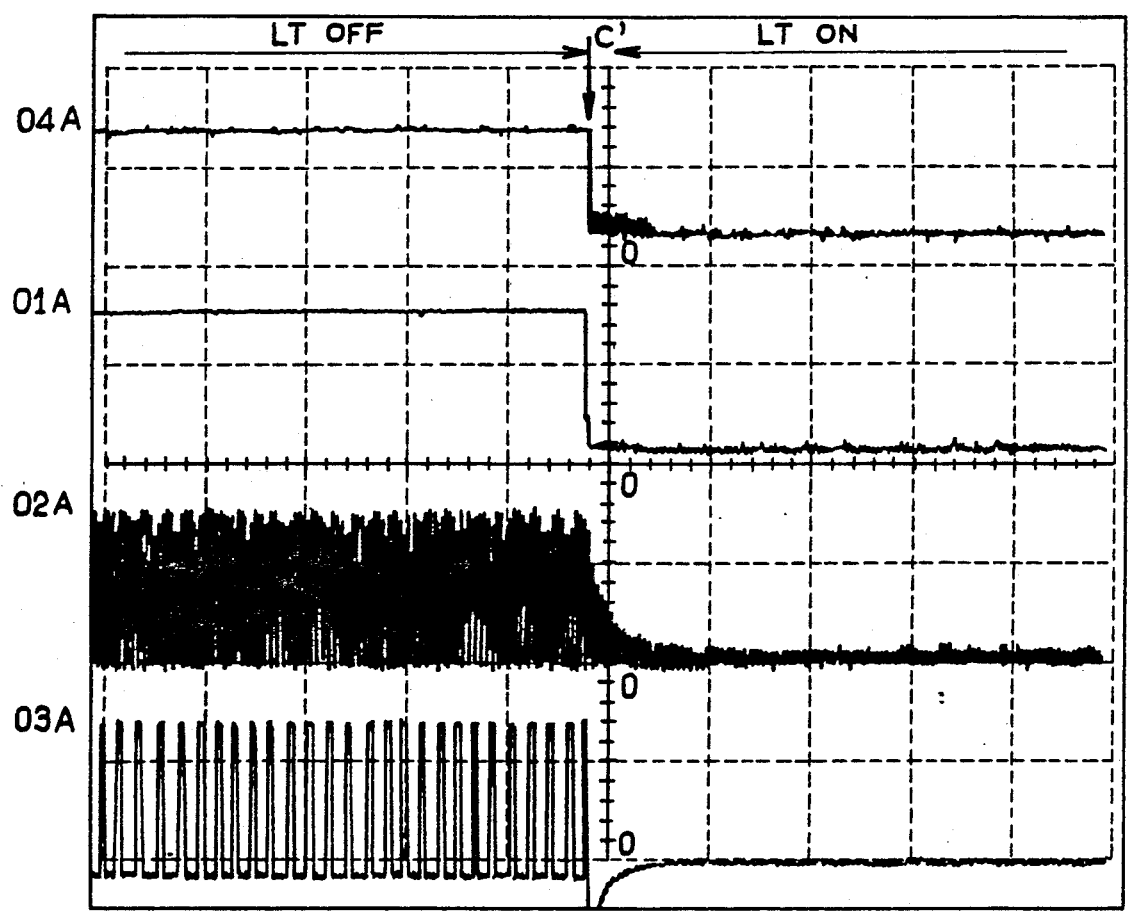
FIG_7

MULTIFUNCTION REGULATOR SYNCHRONIZED TO AN ALTERNATOR

BACKGROUND OF THE INVENTION

1. Field of the invention

The invention relates to a multifunction excitation voltage regulator for an alternator for charging the battery of an automobile vehicle.

2. Description of the prior art

At present excitation voltage regulators for alternators for charging the battery of an automobile vehicle can be divided into two major families, so-called single-function regulators and so-called multifunction regulators, as shown in FIGS. 1a through 1d which relate to the prior art.

As shown in FIGS. 1a and 1b in the case of single-function regulators an indicator lamp LT is connected in series with the ignition switch K and with the field coil In. A half-wave rectifier comprising a trio T of low-power diodes is connected between the phase windings of the alternator ALT and the terminal of the indicator lamp LT that is not connected to the ignition switch K. In normal operation the rectified voltage from the trio of diodes turns off the indicator lamp LT. If the alternator is not running, for example because its drive belt has broken or because the engine of the vehicle is stopped, the indicator lamp LT is turned on and carries a current of between 200 and 300 mA when the ignition switch is closed, the alternator being then in a pre-excitation condition rather than the excitation condition enabling the battery B to be charged.

When the alternator ALT starts and reaches a speed in the region of 1,000 revolutions per minute it "cuts in", changing from the pre-excitation condition created by the indicator lamp LT to the excitation condition created by the alternator ALT and the trio T. The alternator cuts in when the voltage between the phase windings of the alternator is above 1.2 volts. Thus in the case of single-function regulators rotation of the alternator is sensed by the trio T, the indicator lamp LT providing the pre-excitation condition of the field coil In. The terminal EXC of the regulator REG supplies the regulated current in the form of rectangular pulses with a variable cyclic ratio energizing the field coil In. The alternator voltage reference for the regulator is taken from the terminal D+ of the trio T, for example.

The single-function regulator is so called because there is only one way to detect a voltage fault between phases of the alternator by means of the indicator lamp LT and the trio T and no way to detect battery charging voltage regulation faults such as a battery overvoltage or an open-circuit excitation winding, for example.

In multifunction regulators, on the other hand, as shown in FIGS. 1c and 1d the trio T is eliminated and the indicator lamp LT is connected to the regulator REG itself and serves as the single fault indicator. Rotation of the alternator ALT is sensed by an additional connecting wire which connects the regulator REG to one phase winding of the alternator ALT and delivers to the regulator an "alternator phase present" signal PA.

The indicator lamp LT can then indicate other faults such as a battery overvoltage if, for example, the field coil In is permanently excited because of a short-circuit in the switching device controlled by the regulator REG which normally delivers regulated current pulses to the field coil.

Also, a further connecting wire F senses closure of the ignition switch even if the indicator lamp LT should fail. The wire F is installed during manufacture of the vehicle and it has the disadvantage of non-negligible manufacturing cost since it is relatively long as it connects the dashboard of the vehicle to the alternator or the regulator REG.

It should further be noted that in both single-function and multifunction regulators of a conventional kind there is no total integration onto one and the same substrate, a printed circuit being used to interconnect the various semiconductor components of the regulator.

An object of the present invention is to provide a regulator having the characteristics of single-function regulators combined with those of multifunction regulators; accordingly, this type of regulator is referred to hereinafter as a plurifunction regulator.

In addition to the notable feature just mentioned, the regulator in accordance with the invention is intended to remove the risk of full-field excitation of the field coil of the alternator.

Another object of the present invention is a regulator with the signalling device or indicator lamp protected against an auxiliary external supply with a voltage very much higher than the nominal voltage of the alternator being applied to the regulator (this is especially valuable in countries with a northern or continental climate).

Another object of the present invention is a regulator which makes it possible to magnetize automatically the magnetic circuits of the alternator even if the battery is absent.

Another object of the present invention is a regulator in which the sensitivity of the alternator phase voltage input to spurious signals is reduced.

Another object of the present invention is a regulator in which the risk of excitation of the field coil when the alternator is stopped due to the polarization of the stator to a positive potential is eliminated.

Another object of the present invention is a regulator in which the alternator phase voltage filtering system does not increase the amplitude of the alternator phase voltage when the rotation speed of the alternator increases during regulation of the phase voltage.

Another object of the present invention is a regulator whereby discharge of the battery is indicated notwithstanding the existence of a high-amplitude alternator phase voltage created by strong remanence of the magnetic circuit of the alternator.

Another object of the present invention is a regulator in which the response time of the combination of the regulator and the alternator during regulation of the alternator phase voltage is substantially inversely proportional to the rotation speed of the alternator in order to allow for significant variations in the amplitude of the alternator phase voltage during phase voltage regulation at high alternator rotation speeds.

SUMMARY OF THE INVENTION

The present invention consists in a plurifunction device for regulating the excitation voltage of an alternator for charging the battery of an automobile vehicle, comprising a battery voltage input, an alternator phase voltage input, an alternator excitation regulation output, a terminal adapted to be connected to an indicator lamp wired in series with an ignition switch of the vehicle, a field coil power excitation control circuit, a battery voltage sensing circuit connected to said battery voltage input adapted to supply a signal indicating that the alternator-battery connection is broken and an excitation regulation signal related to the peak value and the average value of the battery voltage, an alternator phase voltage amplitude sensing circuit connected to said alternator phase voltage input adapted to supply a first sensing signal relative to a first threshold value corresponding to non-memorized shaping of the alternator phase voltage signal at very low alternator rotation speeds authorizing the establishing of an excitation current with a frequency and a cyclic ratio imposed by the alternator phase voltage signal applied to the alternator phase voltage input to initiate cutting in of the alternator, a second sensing signal relative to an intermediate second threshold value authorizing application of a full-field condition to the alternator during the cutting in process initiated by said first sensing signal and a third sensing signal relative to a third threshold value near the battery charge regulation voltage and indicating the alternator phase voltage amplitude for sensing faults relating to said amplitude, alternator field coil excitation control and memory means adapted to receive said second sensing signal and adapted to supply a signal authorizing said full-field condition during cutting in of the alternator and an alternator phase voltage regulation control signal during load dumping in the circuit supplied by the alternator, timing means for said field coil excitation control and memory means synchronized to the alternator rotation speed adapted to receive said first sensing signal and a fixed-frequency reference clock signal and adapted to supply a timing signal synchronized to the alternator rotation speed receiving said first sensing signal and a fixed-frequency reference clock signal and supplying a timing signal synchronized to the alternator rotation speed when the alternator is rotating or a fixed-frequency timing signal when the alternator is stationary, and conditional field coil excitation voltage control logic means.

The sensing circuit also makes it possible to generate a third sensing signal relative to a threshold value near the battery charging regulation voltage. This value indicates the amplitude of the alternator phase voltage for sensing a fault relating to this amplitude.

In addition to the aforementioned sensing circuit the regulator in accordance with the invention comprises alternator field coil excitation control and memory means adapted to receive the second sensing signal and adapted to deliver a signal authorizing the application of the full-field condition to the field coil of the alternator when the latter cuts in and an alternator phase voltage regulation signal during load dumping in the circuit supplied by the alternator.

Timing means for the field coil excitation control and memory means are synchronized to the alternator rotation speed. These timing means are adapted to receive the first sensing signal and a fixed-frequency reference clock signal and are adapted to deliver a timing signal synchronized to the rotation speed of the alternator when the latter is rotating and a fixed-frequency timing signal when the alternator is stationary. Logic means provide conditional control of the alternator field coil excitation voltage.

The plurifunction regulator in accordance with the invention is particularly well suited to applications in battery charging circuits of heavy goods and other automobile vehicles.

The invention will be better understood from the following description given by way of example only with reference to the appended diagrammatic drawings.

BRIEF DESCRIPTION OF THE DRAWINGS

FIGS. 2a and 2b show a general block diagram of a regulator in accordance with the invention.

FIG. 2d shows various timing diagrams of signals sampled at test points of a pre-excitation circuit included in the regulator in accordance with the invention shown in FIG. 2a.

FIG. 2e shows various timing diagrams of signals sensed at various test points during the starting up of the regulator in accordance with the invention shown in FIG. 2a or 2b.

FIG. 3a shows an alternative non-limiting embodiment of a regulator in accordance with the invention in which a magnetization circuit is further provided in order to magnetize the magnetic circuits of the alternator even in the absence of the battery.

FIG. 3b shows by way of non-limiting example one practical embodiment of a switching circuit sending a control signal to an indicator lamp when a fault condition exists.

FIG. 4 shows various timing diagrams of signals sensed at test points in a regulator in accordance with the invention when a fault condition such as full-field excitation of the field coil of the alternator exists.

FIGS. 5a and 5b show various timing diagrams of signals sensed at test points in a regulator in accordance with the invention during regulation of the alternator phase voltage consequent upon significant load dumping in the circuit supplied by the alternator.

FIGS. 6a and 6b show various timing diagrams of signals sensed at test points in a regulator in accordance with the invention when thre is a fault condition such as an open-circuit between the alternator and the alternator phase voltage input.

FIG. 7 shows various timing diagrams of signals sensed at test points in a regulator in accordance with the invention when there is a fault condition such as an open circuit between the positive rectified alternator output and the battery voltage input of the regulator.

DESCRIPTION OF THE PREFERRED EMBODIMENTS

Figure 1A:
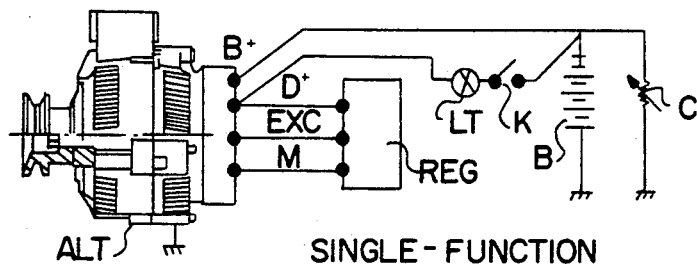
FIGS. 1a through 1d (already described) relate to the prior art.
Figure 1B:
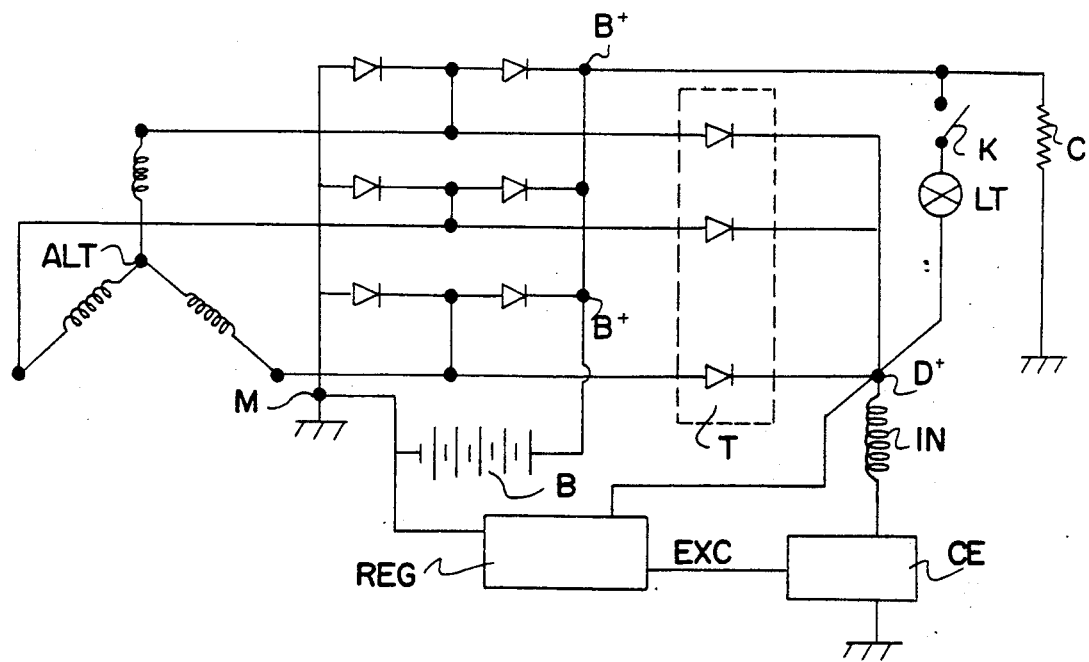
Figure 1C:
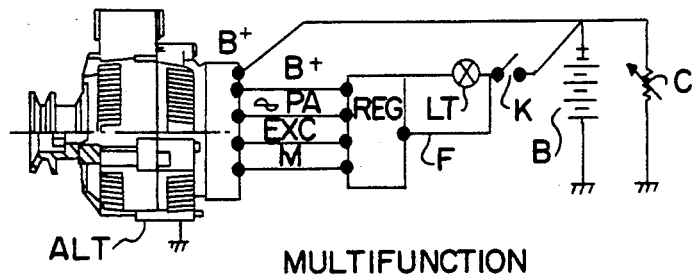
Figure 1D:
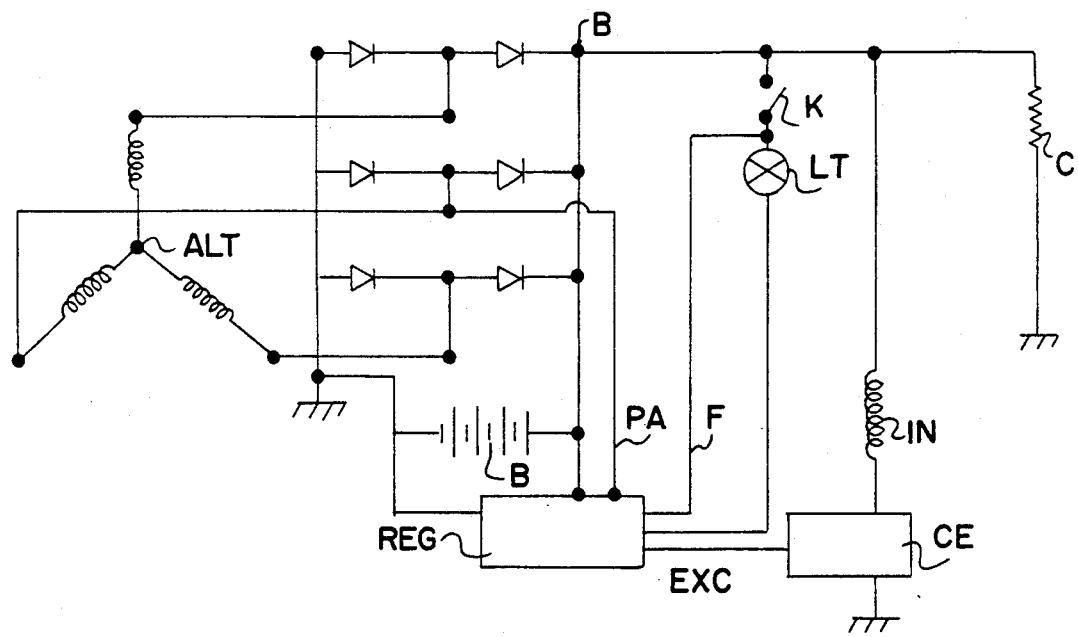

The plurifunction regulator in accordance with the invention for regulating the excitation voltage of an alternator for charging the battery of an automobile vehicle will first be described with reference to FIG. 2a.

In the aforementioned FIG. 2a and in all the figures reference numbers beginning with a 0 relate to component parts of the regulator that are already known from the prior art. As a general rule these components will not be described in detail as they will normally be familiar to those skilled in the art.

In the aforementioned FIG. 2a the regulator in accordance with the invention comprises a battery voltage input 01 normally connected to the terminal B+ supplying the rectified alternator voltage; in this technical field this terminal is usually referred to as the "sense" terminal.

The regulator further comprises an alternator phase voltage input 02, an alternator excitation regulation output 03 and a terminal 04 for connecting an indicator lamp LT normally wired in series with the ignition switch K of the automobile vehicle.

In a monolithic integrated circuit implementation of the regulator in accordance with the invention the terminals 01, 02, 03 and 04 and a ground terminal (not shown in FIG. 2a) delimit the extent of the integrated circuit on the single substrate.

As further shown in FIG. 2a the regulator in accordance with the invention comprises a power excitation control circuit 05 for the field coil In of the alternator. The excitation control circuit 05 is normally connected to the field coil In via the aforementioned terminal 03. The circuit 05 is conventionally implemented by means of power transistors and, being conventional, will not be described in detail. Regulation of the excitation current in the field coil In is controlled from the aforementioned power field coil control circuit 05 by means of a rectifier bridge protection circuit 06. The rectifier bridge protection circuit 06 is also a conventional type circuit which protects the Zener diodes of the rectifier bridge from the alternator output voltage. This circuit will not be described in detail either as it is entirely familiar to those skilled in the art.

One characteristic of the plurifunction regulator in accordance with the invention is that it comprises, as shown in FIG. 2a, a circuit 1 for sensing the battery voltage connected to the battery voltage input 01. The circuit 1 supplies a signal SRAB indicating breaking the alternator-battery connection to the circuit 06 for protecting the Zener diodes of the alternator rectifier bridge, as will be described later, in particular in the event of disconnection and breaking of the alternator-battery connection, as previously mentioned.

The circuit 1 also supplies an excitation regulation signal SRE related to the peak value and the average value of the battery voltage. As will be explained later, the excitation regulation circuit SRE serves to apply the full-field condition to the field coil In of the alternator after the alternator cuts in.

The plurifunction regulator in accordance with the invention for the excitation voltage of a battery charger alternator further comprises a circuit 2 for sensing the amplitude of the alternator phase voltage connected to the alternator phase input 02. The sensing circuit 2 is used to generate a first sensing signal PSD relative to a first threshold value VS0 corresponding to non-memorized shaping of the alternator phase voltage signal available for very low alternator rotation speeds. The sensing signal PSD enables an excitation current to be established at the frequency and with the cyclic ratio imposed by the alternator phase voltage signal applied to the alternator phase voltage input 02 in order to initiate the cutting in of the alternator. By very low alternator rotation speeds is meant the rotation speeds during starting of the engine of the vehicle, for example, these speeds generally being lower than 1,000 revolutions/minute. To give a non-limiting example, the first threshold value VS0 might then be 0.7 Volt so that presence of the alternator phase voltage signal is sensed for very low alternator speeds, at the beginning of the engine starting process.

The alternator phase voltage amplitude sensing circuit 2 also generates a second sensing signal DSD relative to a second or so-called intermediate threshold value VS1. The second sensing signal DSD authorizes application of the full-field condition to the alternator during the cutting in process initiated by the first sensing signal PSD. The threshold value VS1 is classified as an "intermediate" signal because it is preferably between the value of the first threshold VS0 and the nominal battery voltage, for example.

The sensing circuit 2 also generates a third sensing signal TSD relative to a third threshold value VS2. This threshold value is preferably near the battery charging regulation voltage and indicates the amplitude of the alternator phase voltage for sensing faults relating to this amplitude, as will be described in detail later.

As also shown in FIG. 2a the plurifunction regulator in accordance with the invention also comprises alternator field coil excitation control and memory means 3. The memory means 3 receive the second signal DSD and supply a signal SAEP authorizing application of the full-field condition to the field coil In of the alternator when the alternator cuts in and an alternator phase voltage regulation control signal SCR during load shaping in the circuit supplied by the alternator.

As also shown in FIG. 2a the plurifunction regulator in accordance with the invention may comprise means 4 for memorizing the amplitude of the alternator phase voltage. The memory means 4 receive the third sensing signal TSD and supply a memorized alternator phase voltage amplitude signal SPCD for sensing faults relating to this amplitude.

The plurifunction regulator in accordance with the invention also comprises means 5 for timing the field coil excitation control and memory means 3 and the alternator phase voltage amplitude memory means 4. The timing means 5 are synchronized to the alternator rotation speed for high values thereof, as will be explained later.

The aforementioned timing means 5 receive the first sensing signal PSD, that is to say the signal indicating an alternator phase voltage with an amplitude above the first threshold value VS0 (0.7 Volt in this example) and a fixed-frequency reference clock signal CK. To give a non-limiting example the frequency of the fixed-frequency clock signal CK may be 80 Hz. The synchronous timing means 5 supply a timing signal SCS synchronized to the alternator rotation speed when the alternator is rotating and a timing signal at a substantially fixed frequency equal to the frequency of the clock signal CK when the alternator is stationary.

Finally, the plurifunction regulator in accordance with the invention comprises control logic means 6 for conditional control of the excitation voltage of the field coil In.

FIG. 2a further shows a pre-excitation control circuit 8. The pre-excitation control circuit essentially comprises a threshold comparator 82 receiving on a negative input a fixed voltage generated by the bias Zener diode DZ biased via the terminal 04 to which the indicator lamp LT is connected on closing of the automobile vehicle ignition switch K. The comparator 82 receives on a positive terminal a fixed voltage derived from the supply voltage +VCC supplied by a conventional type direct current power supply unit 07 and when the ignition switch K is closed supplies a pre-excitation control signal CP. The pre-excitation control circuit 8 further comprises a set of bistables 80 receiving on a first input a clock signal at a fixed frequency nCK where n is preferably equal to 8. A NOR gate 81 receives on a first input the pre-excitation control signal CP and on three consecutive inputs one output from each of three bistables constituting the set of bistables 80, the last input of the NOR gate 81 receiving the clock signal at frequency CK. The output of the NOR gate 81 supplies a pre-excitation signal SP for controlling the field coil In of the alternator under pre-excitation conditions, as will be explained later.

The pre-excitation control circuit 8 receives from the terminal 04 to which the indicator lamp LT is connected a start-up control signal SCMF generated by operation of the ignition switch K of the vehicle when in use. The signal SP supplied after operation of the ignition switch K is a periodic signal with a cyclic ratio of ⅛ corresponding to the pre-excitation condition of the alternator field coil. In a preferred embodiment the clock signal CK has a frequency of 80 Hz and the signal nCK has a frequency of 640 Hz.

A more detailed description of the conditional control logic means 6 will now be given with reference to FIG. 2a.

In the aforementioned figure the conditional control logic means 6 comprise at first NOR gate 60 receiving on its inputs the conditions which enable excitation of the field coil In of the alternator, these enabling conditions being constituted by the pre-excitation signal SP supplied by the pre-excitation circuit 8 as soon as the ignition switch K is closed, the first sensing signal PSD indicating the alternator phase voltage amplitude for very low alternator rotation speeds and the complemented signal SAEP authorizing the application of the full-field condition which appears immediately the alternator cuts in. Normally this signal remains present until the alternator stops rotating. The output of the first NOR gate 60 supplies an excitation enabling control signal SCAVE.

The conditional control logic means 6 further comprise a second NOR gate 61 receiving on its inputs the excitation regulation signal SRE related to the peak value and the average value of the battery voltage and the excitation enabling control signal SAV supplied by the first NOR gate 60 previously described. The output of the second NOR gate 61 supplies a conditional excitation signal SCE which depends on the voltage measured at the battery or at the alternator output and corresponds to the complemented excitation regulation signal SRE when the excitation validation control signal SCAVE is at a low level.

As also shown in FIG. 2a the conditional control logic means 6 also comprise a third NOR gate 62. This gate receives on its inputs the complemented signal $\overline{SCR}$ supplied by the alternator field coil excitation control and memory means 3 via an inverter I. The NOR gate 62 also receives the signal SAEP authorizing application of the full-field condition to the field coil In of the alternator supplied by the alternator field coil excitation control and memory means 3. The output of the third NOR gate 62 supplies an enabled alternator phase voltage regulation control signal SCRV. The alternator phase voltage regulation control signal SCRV is limited in time by a change in the level of the signal SAEP authorizing application of the full-field condition, so prohibiting further alternator phase voltage regulation in the event of a fault in the alternator phase voltage amplitude sensing circuit 2 or disconnection of the phase input 02, as will be explained later.

The conditional control logic means 6 finally comprise a fourth NOR gate 63 receiving on its inputs at least the conditional excitation signal SCE supplied by the NOR gate 61 and the enabled phase voltage regulation conditional control signal SCRV. The fourth NOR gate 63 supplies a normal excitation control signal SCENR to the power excitation control circuit 05 of the field coil In.

In addition to the components already mentioned the plurifunction regulator in accordance with the invention also comprises alternator fault indicator means 9. The purpose of the indicator means 9 is to turn on the indicator lamp LT in the presence of a plurality of faults to signal them to the vehicle user, this justifying the description of the regulator in accordance with the invention as a "plurifunction" regulator.

As shown in FIG. 2a, to provide complete control over fault indication the plurifunction regulator in accordance with the invention comprises an excitation sensing circuit 10 delivering a signal SPE indicating presence or absence of alternator excitation.

As shown in FIG. 2a the excitation sensing circuit 10 may comprise a switching circuit in the form of a common-emitter transistor 100 the collector of which is connected by a resistor 103 to the supply voltage +VCC of the device and the base of which is connected by a resistor 101 to the alternator excitation regulation output 03, the base of the transistor 100 being also grounded through a diode 102. In the presence of an excitation voltage for the field coil In of the alternator the switching circuit comprising the transistor 100 and the aforementioned biasing components turns on the aforementioned transistor to produce a low-level signal SPE representing the presence of excitation. In the absence of any excitation voltage the transistor 100 is turned off and the signal SPE is at a high level representing absence of the alternator field coil excitation signal.

As further shown in FIG. 2a the alternator fault indicator means 9 may advantageously comprise an alternator fault indication control logic circuit 90 for generating a conditional battery charge fault control signal SCED from the excitation regulation signal SRE related to the average value and the peak value of the battery voltage, the memorized alternator phase voltage amplitude signal SPCD supplied by the alternator phase voltage amplitude memory means 4 and the signal SPE supplied by the excitation sensing circuit 10. The aforementioned fault indicator means 9 also comprise a time-delay circuit 91 receiving the conditional alternator fault control signal SCED supplied by the indication control logic circuit and supplying an actual alternator fault presence signal SPED.

A switching circuit 92 receives the actual alternator fault presence signal SPED and selectively energizes the terminal 04 to turn off or turn on the alternator fault indicator lamp LT.

A more detailed description of the fault indication control logic circuit 90 will now be given with reference to FIG. 2a.

If the conditional fault existence control signal SCED is present for longer than the time-delay period the aforementioned fault indication control logic circuit 90 commands indication of the fault by turning on the indicator lamp LT according to the values of the battery voltage and the field coil excitation presence or absence signal SPE as shown in the following table:

| SPE | UB < Un | UB > Un |
|---|---|---|
| $\overline{Ex}$ | LT = 1 | LT = 0 |
| Ex | LT = 0 | LT = 1 |

In the above table, Ex represents the presence of an excitation current and $\overline{Ex}$ the absence of an excitation current for the field coil In of the alternator, Un represents the nominal battery voltage and UB represents the actual battery voltage. The values LT=1 represent the presence of a battery charging fault (the indicator lamp LT is turned on) and the values LT=0 represent the absence of any such fault (the indicator lamp LT is turned off). To implement the logic relationship of the above table the fault indication control logic circuit 90 advantageously comprises, as shown in FIG. 2a, an exclusive-OR gate 900B receiving on a first input the excitation regulation signal SRE related to the peak value and the average value of the battery voltage and on a second input the signal SPE indicating presence or absence of excitation of the field coil In of the alternator. The exclusive-OR gate 900B supplies a first conditional fault presence signal SPCD2.

If the conditional fault presence control signal SCED is present for longer than the time-delay period the fault indication control logic circuit 90 commands indication of the fault by turning on the indicator lamp LT according to the values of the battery voltage and the alternator phase voltage as shown in the following table:

| Up | UB < Un | UB > Un |
|---|---|---|
| Up < Vs2 | LT = 1 | LT = 0 |
| Up > Vs2 | LT = 0 | LT = 1 |

In the above table Vs2 represents the comparison threshold voltage of the alternator phase voltage amplitude sensing circuit, Un represents the nominal battery voltage, UB represents the actual battery voltage and Up represents the alternator phase voltage. The values LT=1 represent the presence of a battery charging fault (the indicator lamp LT is turned on) and the values LT=0 represent the absence of any such fault (the indicator lamp LT is turned off).

To implement the logic relationship of the above table the fault indication control logic circuit 90 advantageously comprises, as shown in FIG. 2a, an exclusive-OR gate 900A receiving on a first input the excitation regulation signal SRE related to the peak value and the average value of the battery voltage and on a second input the memorized alternator phase voltage amplitude signal SPCD. The exclusive-OR gate 900A supplies a conditional fault presence signal SPCD1.

The fault indication control logic circuit 90 finally comprises a NOR gate 902 receiving on respective inputs the two conditional fault presence signals SPCD1 and SPCD2 respectively supplied by the exclusive-OR gates 900A and 900B. The NOR gate 902 supplies the previously mentioned resultant conditional battery charge fault presence signal SCED.

FIG. 2a shows the timing means 5 for the field coil excitation control and memory means and the alternator phase voltage amplitude memory means synchronized to the rotation speed of the alternator. The timing means 5 comprise by way of non-limiting example an exclusive-OR gate 50 receiving on a first input a fixed-frequency reference clock signal CK and on a second input the first sensing signal PSD corresponding to non-memorized shaping of the alternator phase signal at very low alternator rotation speeds. The exclusive-OR gate 50 supplies to the alternator field coil full-field excitation control and memory means 3 and to the alternator phase voltage amplitude memory means 4 a timing signal SCS synchronized to the alternator rotation speed.

Figure 2B:
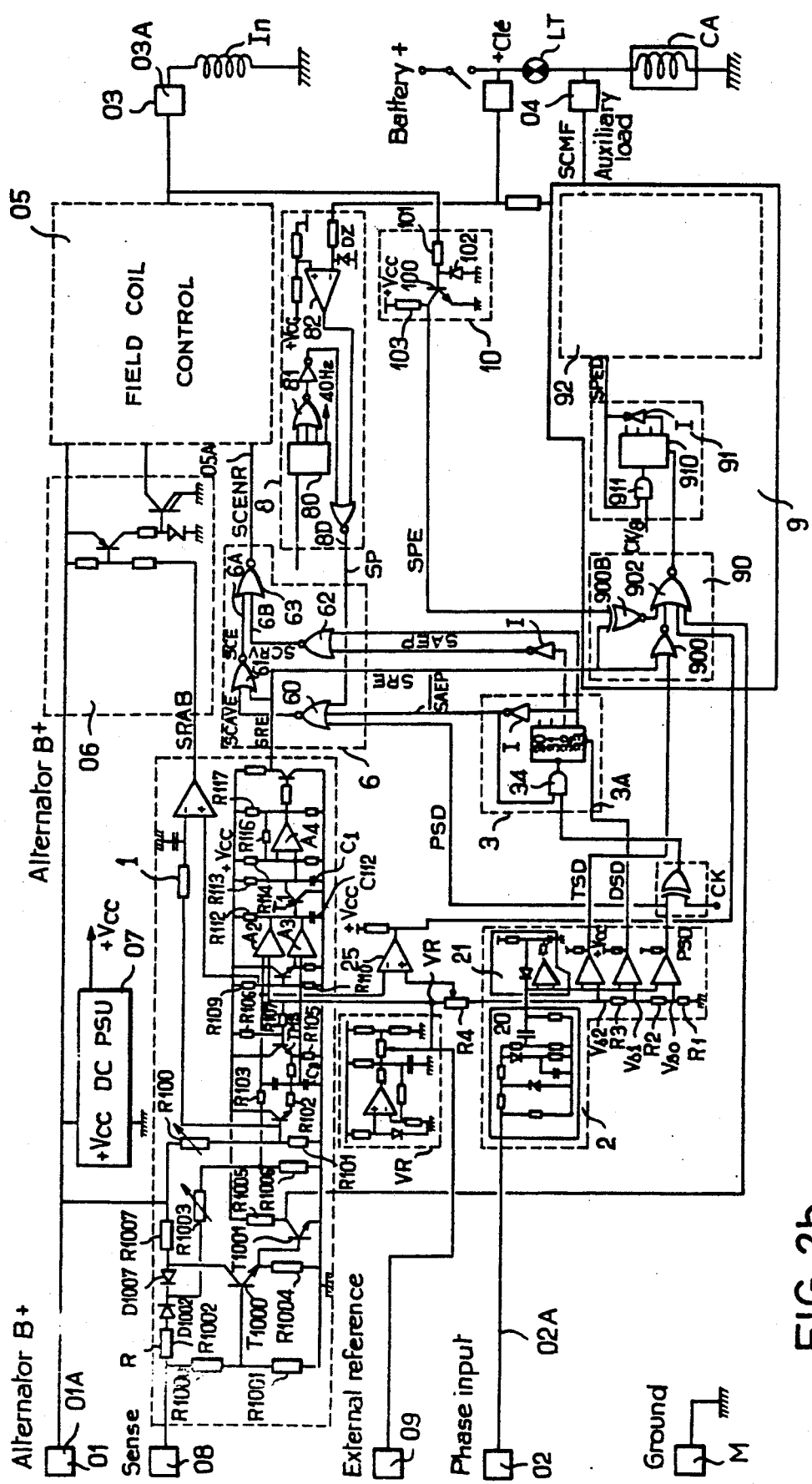

FIG. 2b shows a simplified embodiment of the regulator in accordance with the invention as shown in FIG. 2a from which the amplitude memory means 4 have been eliminated. In this case the exclusive-OR gate 900A from FIG. 2a is replaced by a NOR gate 900 receiving directly the third sensing signal TSD and the excitation regulation signal SRE related to the peak value, supplied by the circuit 1. The output of the NOR gate 900 is connected to an input of the NOR gate 902.

An interface circuit comprising two cascade-connected transistors T1000, T1001 receiving the signal from the "sense" terminal 08 through a divider bridge R1000, R1001 integrates the sense function into the regulator. The voltage at the collector of the transistor T1001 loaded by a resistor R1005 connected to the +Vcc supply is applied direct to an input of the NOR gate 902. The variable resistance bridge R1003, R1006 adjusts the voltage applied to the negative terminal of the amplifier A2, the details of which will be explained later.

The battery voltage B+ terminal 01 is connected to the regulator in FIG. 2b through the aforementioned interface circuit.

The role of the interface circuit is to pass on selectively the voltage at the "sense" terminal 08. As shown in FIG. 2b, this can be separate from the alternator B+ terminal 01 and connected direct to the positive terminal of the battery, to enable more precise regulation related to the actual value of the battery voltage.

If the connection from the "sense" terminal 08 to the battery is accidentally broken the terminal 08 is grounded through the resistors R1000, R1001. The transistor T1000 is turned off which, as the diode D1002 is reverse-biased, applies the alternator voltage B+ at the terminal 01 through the diode D1007 and the variable resistance bridge R1003, R1006 to the filter circuit R103, C2, C3, the voltage B+ serving as the "sense" voltage. The subsequent processing of this signal by the regulation means 1 related to the peak value will be described later and is the same whether the signal present at R1006 (on which the regulation is performed) is that from the "sense" terminal 08 or that from the alternator B+ terminal 01. After the transistor T1000 is turned off the transistor T1001 is turned off and its collector voltage is passed to the NOR gate 902 to indicate the unavailability of the "sense" voltage at the terminal 08.

A comparator 25 has a negative terminal connected to the common point of the resistors R1003 and R1006 and a positive terminal connected to the voltage reference terminal VR of the regulator which is in turn connected to an external reference terminal 09. The output of the comparator 25 is connected to an input of the NOR gate 902.

The external reference terminal 09 is connected to receive an exernal reference voltage which is less than the nominal value Un of the battery voltage, this external reference voltage taking a value between 10 V and 11 V, for example. If the connection from the battery to the alternator B+ output whereby the battery is charged by the alternator should be accidentally broken the battery is no longer charged. The excitation current of the field coil In of the alternator increases as does the alternator phase voltage Up, without the battery being charged, and the sense voltage at the terminal 08 decreases. This voltage is supplied to the negative input of the comparator 25 which is triggered when the aforementioned voltage drops below the external reference voltage at terminal 09 set by the resistor R4. The voltage supplied by the comparator 25 to the NOR gate 902 after it is triggered indicates the fault due to absence of battery charging.

Figure 2C:
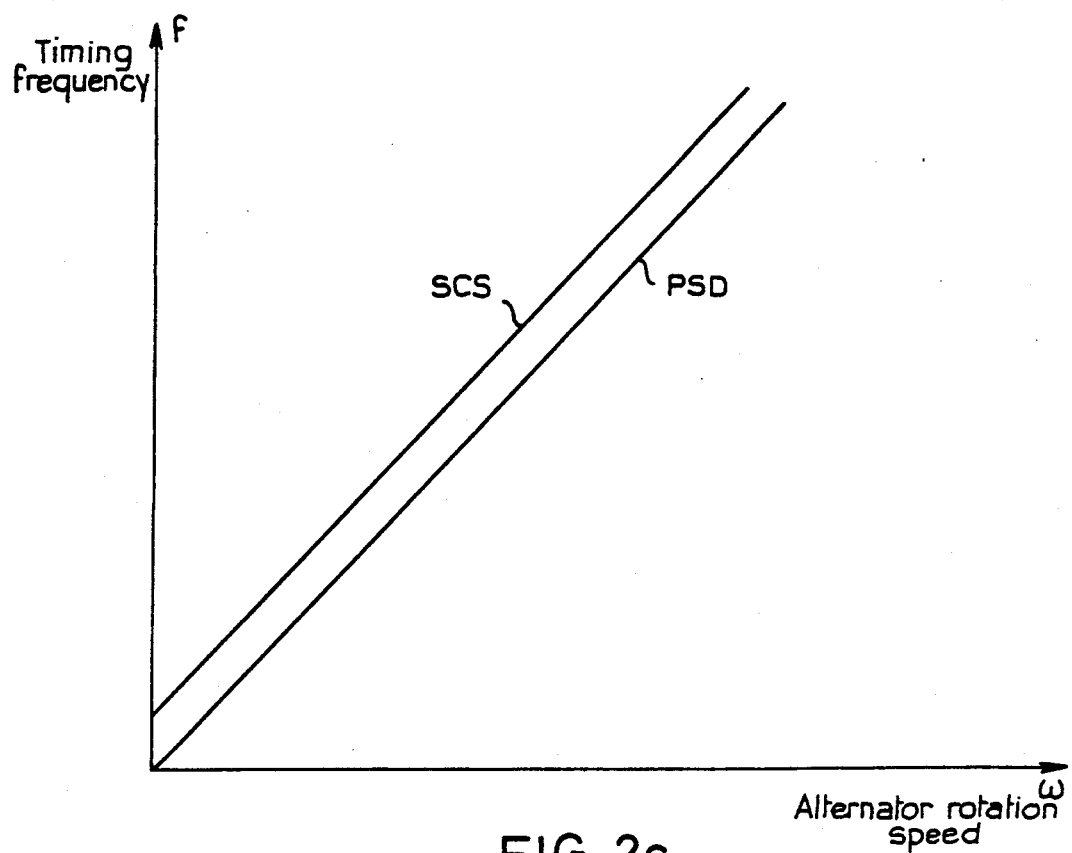
FIG. 2c shows an alternator rotation speed/frequency characteristic relating to the timing means synchronized to the alternator.

FIG. 2c shows the variation in the frequency of the signal SCS as a function of the angular rotation speed of the alternator. It will be understood that the frequency of the signal SCS is substantially constant and equal to the frequency of the clock signal CK; it is therefore equal to 80 Hz, for example, for alternator rotation speeds of 100 revolutions/minute or below, the frequency of the signal SCS being thereafter substantially proportional to the alternator rotation speed.

As further shown in FIGS. 2a and 2b the alternator field coil excitation control and memory means 3 and the alternator phase voltage amplitude memory means 4 comprise respective series of four and three bistables 30 through 33, 40 through 42. These are JK bistables connected in cascade, the reset to zero inputs of each series of bistables respectively receiving the second sensing signal DSD and the third sensing signal TSD. The aforementioned memory means 3 and 4 further comprise respective NAND gates 33, 44 both receiving on a first input the timing signal SCS synchronized to the alternator rotation speed and each receiving on a respective second input the signal at the output of the fourth bistable 33 or the third bistable 42 of the corresponding series of bistables, through an inverter I. The output of the NAND gate 34, 44 supplies to the timing input of the bistables of the corresponding series the enabled synchronous timing signal SCSV. On the occurrence of the second sensing signal DSD or the third sensing signal TSD, respectively, all the aforementioned bistables are reset to zero and the signals SAEP and SPCD are held at the zero level. In the absence of or on disappearance of the respective second sensing signal DSD or third sensing signal TSD the timing signal SCS changes the state of the bistables 30 through 33 or 40 through 42 until the output of the respective bistable 33 or 42 goes to 1, this 1 state being converted to a 0 state by the inverters I connected to the second inputs of the NAND gates 34 and 44, respectively. In this case the signal SCS is no longer passed by the NAND gates 34 and 44 and the respective signals SAEP and SPCD remain at 1 for as long as the signals DSD and TSD are absent.

A more detailed description of the alternator phase voltage amplitude sensing circuit 2 will now be given with reference to FIG. 2a. In the aforementioned figure the alternator phase voltage amplitude sensing circuit 2 includes a resistor-capacitor filter circuit 20 including a clipping diode 200 and deriving from the signal at the alternator phase voltage input 02 a filtered alternator phase voltage signal. The diode 200 clips spurious overvoltages at a capacitor 201 storing the maximum value of the alternator phase voltage amplitude.

The alternator phase voltage amplitude sensing circuit 2 also includes an alignment circuit 21 receiving the filtered alternator phase voltage signal and supplying an aligned filtered alternator phase voltage signal with its negative peaks aligned with the ground potential of the device.

A first voltage comparator 22 receives on a positive first input a first reference voltage Vr1 and on a negative second input the aligned filtered alternator phase voltage signal. The first comparator 22 supplies at its output the first sensing signal PSD.

A second voltage comparator 23 receives on a negative first input a second reference voltage Vr2 and on a positive second input the aligned filtered alternator phase voltage signal. The second comparator 23 supplies at its output the second sensing signal DSD.

A third voltage comparator 24 receives on a negative first input a third reference voltage Vr3 and on a positive second input the aligned filtered alternator phase voltage signal. The third comparator 24 supplies the third sensing voltage TSD.

It will be understood that the reference voltages Vr1, Vr2, Vr3 respectively correspond to the aforementioned threshold voltages Vs0, Vs1, Vs2.

As shown in FIG. 2a the reference volages Vr1, Vr2, Vr3 can be generated by a temperature-stabilized voltage reference generator VR and a potentiometer divider R1 through R4 connected to the output of the voltage reference generator VR.

The second reference voltage Vr2 is preferably greater than the peak value after filtering of the spurious overvoltages applied to the second input of the second comparator 23 when the alternator is not rotating or if the alternator phase input 02 is disconnected from the alternator, in order to distinguish between these spurious overvoltages and the alternator phase signal.

The third reference voltage Vr3 is greater than the peak value of the alternator phase voltage applied to the second input of the third comparator 24 when the alternator phase voltage is obtained with no excitation current by virtue only of the remanence of the magnetic circuit when the alternator rotation speed is maximum.

To give a non-limiting example, the threshold voltage Vs0 may be 0.7 Volt, the threshold voltage Vs1 may be 7 Volts and the threshold voltage Vs2 may be 12 Volts.

As further shown in FIG. 2a the battery voltage sensing circuit 1 includes a circuit 1A for sensing and memorizing the peak value of the rectified voltage applied to the battery.

The sensing circuit 1 also includes a first comparator A2 receiving on a positive terminal a threshold or set point value VR supplies by the previously described circuit VR. This threshold or set point value VR is representative of the battery charging set point voltage. The first comparator A2 receives on a negative terminal the filtered alternator signal Vs.

The sensing circuit 1 also includes a discharge circuit comprising a switching transistor T1. The base of this transistor is connected to the output of the first comparator A2. A resistor-capacitor time-delay circuit R113-C1 imposes a maximum regulation frequency. The capacitor C1 is connected between the collector and the emitter of the transistor T1 constituting a discharge circuit for the capacitor C1 and the resistor R113 is a charging resistor for the capacitor C1.

A twin-threshold second comparator A4 has a negative terminal connected direct to the common point of the resistor R113 and the capacitor C1 and a positive terminal connected to the intermediate point of a divider bridge R114, R115. The output of the comparator A4 is connected in a feedback loop to this intermediate point through a resistor R116.

The sensing circuit also includes a third comparator A3 which receives on a positive terminal a threshold value representative of an alternator voltage peak value that is not to be exceeded and on a negative terminal the envelope signal of the peak value Vc of the alternator voltage supplied at the output BS of the sensing circuit 1A. The output of the third comparator A3 is connected to the base of the switching transistor T1.

In FIG. 2a the bias resistors of the sensing circuit 1 are denoted R100 through R120. The values of these resistors may be determined solely by application of the information provided by the manufacturers of the corresponding electronic components used to implement the sensing circuit 1.

To enable implementation of the plurifunction regulator in accordance with the invention as shown in FIG. 2a as a monolithic integrated circuit on a single substrate, the peak value memory circuit comprises a transistor TA1 and a capacitor C3 constituting the peak value envelope memory circuit connected to the emitter of the transistor TA1 through a resistor R102 and to receive the regulator reference voltage VM, this reference voltage being the ground voltage of the regulator. A transistor TMS is provided to compensate during discharging of the capacitor C3 the emitter-base junction voltage introduced during charging by the transistor TA1.

For a more detailed description of the battery voltage sensing circuit 1 reference may advantageously be had to French patent application No 88 04819 filed 12/04/88 and introduced into the present description by way of reference.

A more detailed description of the operation of the plurifunction regulator in accordance with the invention as shown in FIG. 2a will now be given with reference to FIGS. 2d and 2e which show timing diagrams of signals sensed at test points in FIG. 2a.

Figure 2D:
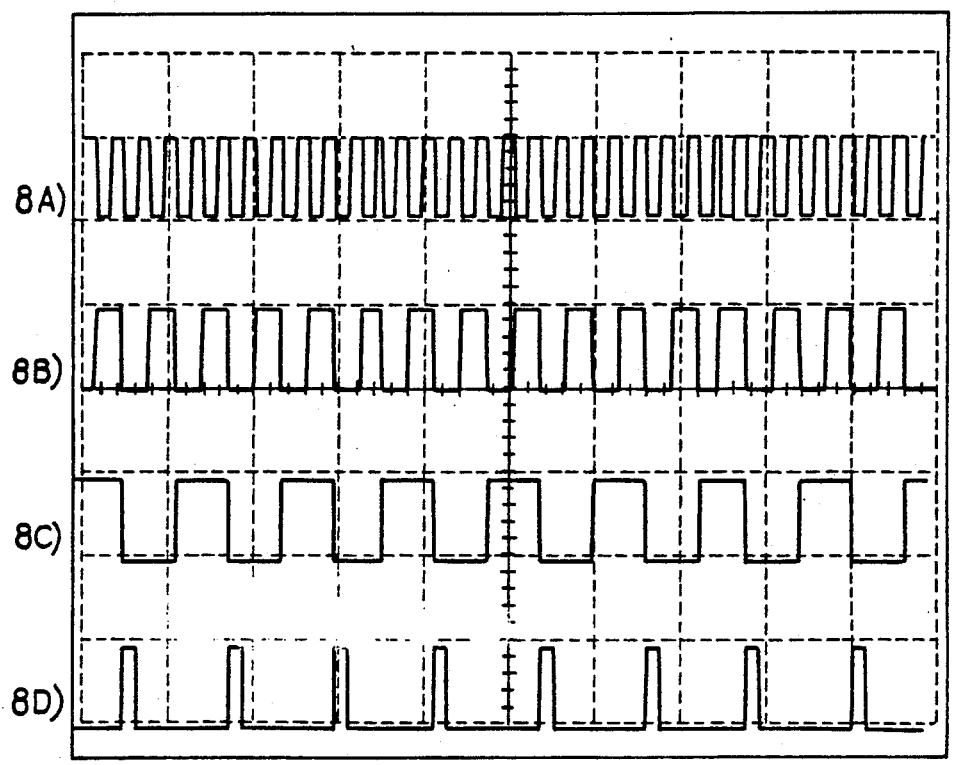

FIG. 2d shows firstly the timing diagram of the signals present at a test point 8A which is at the output of the first bistable of the series of bistables 80 following the presence of a start-up signal SCMF from the ignition switch K of the automobile vehicle.

The same FIG. 2d then shows the signals present at test points 8B and 8C respectively located at the outputs of the second and third bistables of the series of bistables 80, the signals present at points 8B and 8C being obtained by dividing down the frequency of the signals present at point 8A.

The same FIG. 2d finally shows the signal SP corresponding to the pre-excitation signal at the output of the NOR gate 81. This signal is the signal with a cyclic ratio of ½ securing pre-excitation of the alternator before the alternator cuts in.

Similarly, FIG. 2e shows the alternator phase voltage signal present at the phase input 02, specifically at the test point 02A. This signal is shown for very low rotation speeds, that is to say at the beginning of rotation of the alternator for speeds of 1,000 revolutions/minute or less.

Similarly, there is also shown the signal present at test point 04A, in other words at the input 04, during the pre-excitation period. In this case the voltage at the terminal 04 is near the low-level voltage for turning on the indicator lamp LT.

FIG. 2e then shows the voltage present at test point 6A, in other words the signal SCE delivered by the conventional control logic means 6 when the alternator phase voltage signal is above the first threshold value Vs0, that is to say when the peak-to-peak amplitude of the alternator phase signal exceeds 0.7 Volt. In this case the comparator 22 delivers the first sensing signal PSD which by means of the NOR gate 60 is superimposed on the pre-excitation signal SP at test point 6A to constitute the signal SCE, as shown in FIG. 2e; the signal SCAVE supplied by the NOR gate 60 is successively passed by the NOR gates 61 and 63, the NOR gate 60 supplying the enabling signal SCAVE to the NOR gate 61 which then passes the regulation signal SRE to the NOR gate 63. On the timing diagram in FIG. 2e representing the signal at test point 6A the cyclic ratio of the signals is around 50%, this cyclic ratio being produced by the alternator phase signal with an amplitude above 0.7 Volt. The spikes superimposed on the low level of the signal SCENR are caused by the pre-excitation signal SP which is still present.

From this moment the alternator phase voltage increases very rapidly, by virtue of a cumulative phenomenon, and quickly reaches the intermediate value corresponding to the threshold Vs1, for which a value of substantially 7 Volts has been taken by way of non-limiting example. The comparator 23 is triggered and supplies the second sensing signal DSD which resets to zero the bistables 30, 31, 32, 33 of the set of bistables constituting the alternator field coil excitation control and memory means 3. The signal SAEP supplied by the bistable 33 through the inverter I and constituting the full-field excitation authorization signal is then passed by the NOR gate 60 to enable full-field excitation of the field coil In of the alternator.

While the alternator phase voltage is increasing, that is to say before the alternator actually cuts in as a result of triggering of the comparator 23, the timing signal SCS changes the state of the bistables 40 through 42 until the output of the bistable 42 goes to 1. This 1 state is maintained for as long as the alternator phase voltage Up remains below the threshold voltage Vs2. As the stage prior to the alternator cutting in corresponds to absence of battery charging the actual battery voltage UB is less than its nominal voltage Un. The two conditions Up<Vs2 and UB<Un cause the indicator lamp LT to be turned on (LT=1) in the same way as when a fault exists. This phase before the alternator cuts in is shown in FIG. 2e, the voltage at test point 04A corresponding to the indicator lamp LT being turned on.

As soon as the alternator cuts in the alternator phase voltage Up rises above the threshold voltage Vs2. The two conditions Up>Vs2 and UB<Un correspond to turning off of the indicator lamp LT (LT=0). The regulator functions in "free frequency" mode, the regulation signal SRE supplied by the sensing circuit 1 securing corresponding regulation of the energization voltage to the field coil In of the alternator.

An alternative embodiment of the plurifunction regulator in accordance with the invention will now be described with reference to FIG. 3a in which, according to an advantageous but non-limiting characteristic of the invention, the plurifunction regulator in accordance with the invention includes a circuit for magnetizing the alternator in order to magnetize the magnetic circuits of the alternator when the voltage is applied to the regulator with the alternator stationary.

As shown in FIG. 3a the alternator magnetization circuit 7 starts to operate as soon as the direct current supply voltage +Vcc produced by the previously mentioned power supply unit 07 is applied to the regulator.

As shown in FIG. 3a the magnetization circuit 7 comprises a series of bistables 70 and a NOR gate 71 with a first input connected to the output of the last bistable of the set of bistables 70 and a second input receiving the complemented full-field excitation authorization signal $\overline{SAEP}$. The first input of the NOR gate 71 is connected to an input of a NAND gate 72 through an inverter I. Another input of the NAND gate 72 receives a fixed-frequency clock signal, for example a clock signal at a frequency 10 Hz or a frequency equal to CK/8. The output of the NAND gate 72 is connected to the control input of the set of bistables 70 which may comprise a series of JK bistables. The reset to zero input of the series of bistables 70 is connected to receive the supply voltage +Vcc by a resistor-capacitor circuit and a diode D for triggering and setting to zero the outputs of the bistable 70 voltage is applied to the regulator.

Of course, the complemented signal $\overline{SAEP}$ authorizing application of the full-field condition to the field coil In enables the magnetization circuit 7 to be disabled as soon as the alternator cuts in. The NOR gate 71 therefore supplied a magnetization control signal SCM by virtue of which the magnetic circuit of the alternator can be magnetized when the alternator is stationary, as will be explained later.

To this end the fourth NOR gate 63 of the control logic means 6 has an input receiving the magnetization control signal SCM.

Similarly, the fault indication control logic circuit 90 has an input receiving the magnetization control signal SCM to prevent the indicator lamp LT being turned on during a magnetization process as this process may be conducted at a high voltage (in the order of 24 Volts) likely to damage the indicator lamp is turned on. If the conditional fault presence control signal SCED is present for longer than the time-delay period the fault indication control logic circuit 90 commands indication of the fault by turning on the indicator lamp LT according to the values of the battery voltage and the alternator phase voltage as shown in the following table:

| | UB | |
|---|---|---|
| Up | UB < Un | UB > Un |
| Up < Vs2 | LT = 1 | LT = 0 |
| Up > Vs2 | LT = 0 | LT = 1 |

In the above table Vs2 represents the comparison threshold voltage of the alternator phase voltage amplitude sensing circuit, Un represents the nominal battery voltage, UB represents the actual battery voltage and Up represents the alternator phase voltage. The values LT=1 represent the presence of the battery charging fault condition (the indicator lamp LT is turned on) and the values LT=0 represent the absence of the fault condition (the indicator lamp LT is turned off).

To implement the logic relationship of the above table the fault indication control logic circuit 90 advantageously comprises, as shown in FIG. 3a, an exclusive-OR gate 900A receiving on a first input the excitation regulation signal SRE related to the peak value and the average value of the battery voltage and on a second input the memorized alternator phase voltage amplitude signal SPCD. The exclusive-OR gate 900A supplies a conditional fault presence signal SPCD1. The fault indication control circuit 90 also includes a first NOR gate 901 receiving on a first input through an inverter I the excitation regulation signal SRE related to the peak value and the average value of the battery voltage, on a second input the signal SPE indicating presence or absence of alternator field coil excitation and on a third input the magnetization control signal SCM. The first NOR gate 901 supplies a second conditional fault presence signal SPCD2 in the absence of any magnetization control signal.

A second NOR gate 902 constitutes the fault indication control logic circuit 90. The second NOR gate 902 receives on respective inputs the two conditional fault presence signals SBCD1 and SBCD2 and supplies said conditional battery charging fault presence signal SCED.

As shown in FIGS. 2a, 2b and 3a, the time-delay circuit 91 of the alternator fault indicator means 9 conventionally includes a set of cascaded JK bistables 910, the input of the last bistable receiving the signal SCED supplied by the logic circuit 90 and the output of the last bistable being connected by an inverter I to a NAND gate 911 which receives on another input a clock signal of frequency CK/8, for example. The signal supplied by the time-delay circuit 91 at the output of the inverter I corresponds to the signal SCED delayed by a sufficient time period to confirm the actual presence of an alternator fault, the signal supplied by the time-delay circuit 91 corresponding to the signal SPED.

FIG. 3b also shows an advantageous but non-limiting embodiment of the switching circuit 92.

This may advantageously comprise a power stage 920 connected by a diode 9200 to the terminal 04 connected to the indicator lamp to supply an auxiliary load CA.

The switching circuit 92 may also include a fault indication control stage 921 connected to the terminal 04 to apply thereto in the presence of a fault a potential near the ground potential of the regulator in accordance with the invention. As shown in FIG. 3b, the stage 921 may comprise a switching transistor T921 the base of which is connected by bias resistors R and a diode D921 to the output of the power stage 920 on the input side of the diode 9200 and the collector of which is connected by a resistor bridge to the cathode of the sanme diode. The cathode of the diode 9200 is connected to the indicator lamp LT terminal 04. The collector of the common-emitter transistor T921 is connected to the base of a power transistor T922 connected in cascade with a transistor T923 the base of which is connected to the common point of the resistors of the resistor bridge connected to the collector of the transistor T921 and to the common point of Zener diodes ZD923 and ZD922 connected in parallel with the resistors R. When the power stage 920 switches the transistors T922, T923 are turned off to apply to the indicator lamp LT terminal 04 a voltage near the nominal battery voltage; when the transistors T922, T9232 are turned on the potential at the terminal 04 is at a low level to enable the indicator lamp LT to be turned on.

A more detailed description of the functioning of a plurifunction regulator in accordance with the invention as shown in FIG. 2a or FIG. 3a, for example, will now be given with reference to FIGS. 4, 5a, 5b, 6a, 6b and 7 in the case where a specific fault exists in the plurifunction regulator in accordance with the invention or in an operating mode such as regulation of the alternator phase voltage in the event of dumping of a large load, for example.

In the presence of the aforementioned fault D, corresponding to the application of the full-field condition to the field coil In, as shown in FIG. 4, the alternator voltage B+ at the input 01 (at the test point 01A, for example), previously substantially equal to the nominal battery voltage, increases.

Similarly the alternator phase voltage at the input terminal 02, specifically at the test point 02A, also increases, as shown in FIG. 4.

Similarly the voltage at the indicator lamp LT terminal 04, specifically at the test point 04A, also increases, the lamp LT being turned off. This increase continues throughout the time-delay introduced by the time-delay circuit 91 which shifts by the time-delay duration the appearance of the signal SPED at the output of the time-delay circuit 91. At the end of the aforementioned time-delay the signal SPED is supplied by the time-delay circuit 91 and triggers the switching circuit 92 to apply to the terminal 04 (and to the test point 04A) the low-level saturation voltage of the transistors T922 and T923 shown in FIG. 3b. Immediately the foregoing switching has occurred, the terminal 04 being at a low potential, the lamp LT is turned on to indicate the aforementioned fault in the field coil In.

The final timing diagram in FIG. 4 shows the signal present at the test point 03A, that is to say at the input terminal 03 of the field coil In, prior to the appearance of the fault D, at which time the regulator functions as a free-frequency regulator, as previously described, and then after the appearance of the fault D, the voltage applied to the field coil In because of the presence of the fault being then equal to the alternator voltage B+, as previously explained.

The plurifunction regulator in accordance with the invention therefore makes it possible to indicate the existence of a fault with the field coil In short-circuited to the alternator voltage B+, for example.

Figure 5A:
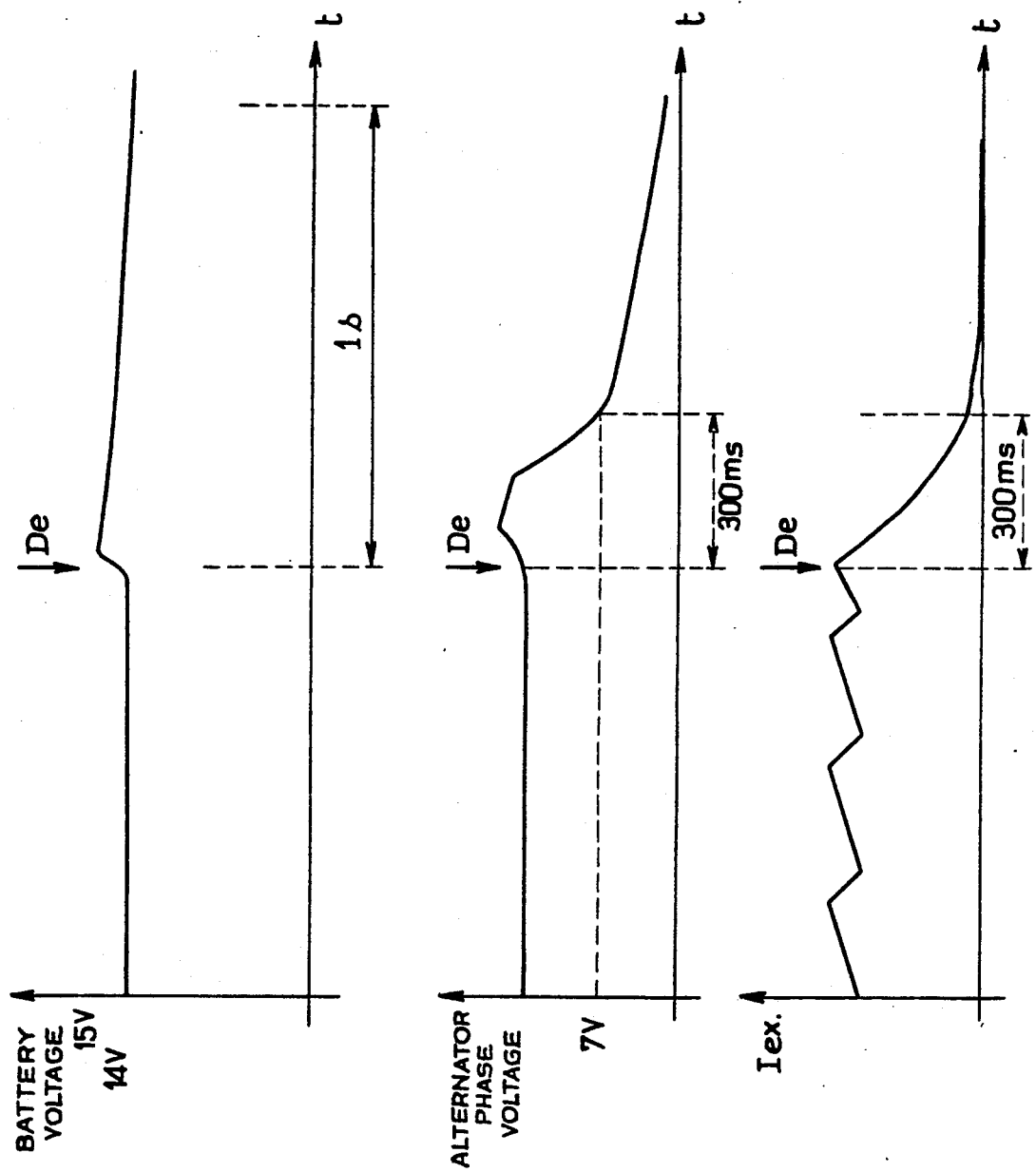

FIGS. 5a, 5b show the trend of the signals at various test points in FIG. 2a or 3a in the case of the removal of a large load in the event of load dumping, for example.

FIG. 5a shows the excitation current of the alternator on the aforementioned load dumping De. Prior to the aforementioned load dumping the excitation current corresponds to a free-frequency regulation current; the excitation current increases in a substantially exponential manner but retaining a significantly high value over a period of approximately 300 ms from the time of the load dumping De.

As also shown in FIG. 5a the alternator phase voltage rises rapidly from the time of the load dumping De and then falls off as the excitation current decreases. Following the load dumping the battery voltage increases rapidly to a value in the order of 15 Volts and then slowly decreases to the nominal voltage in the order of 14 Volts.

One particularly advantageous feature of the plurifunction regulator in accordance with the invention is that by sensing the alternator phase voltage signal relative to the second reference voltage Vr2 by means of the comparator 23 it makes it possible to prevent the alternator phase voltage falling below the threshold value Vs1, in the order of substantially 7 Volts. This is justified in order to obtain a minimal value of the alternator phase voltage which will be maintained even in the event of load dumping in the load circuit.

FIG. 5b shows various timing diagrams of signals at test points 02A, 3A and 6B during the aforemented load dumping De, the regulator in accordance with the invention regulating the corresponding alternator phase voltage.

The timing diagram of the signal at the alternator phase input 02, specifically at the test point 02A, has a substantially constant amplitude regulated around the average value of 7 Volts corresponding to the threshold value Vs1.

The timing diagram for test point 6B shown in FIG. 5b represents the excitation signal SCRV supplied at the output of the NOR gate 62 from the alternator field coil excitation control and memory means 3 when the aforementioned comparator 23 is triggered.

Finally, the timing diagram for test point 3A shown in FIG. 5b represents the second sensing signal DSD supplied by the comparator 23. The aforementioned second sensing signal has a null value if the alternator phase voltage at the input 02 is below VS1 and otherwise corresponds to pulses synchronized to the alternator phase signal.

If the alternator phase voltage at the input 02 is above VS1 the second sensing signal DSD is made up of pulses synchronized with the alternator phase signal, as shown in FIG. 5b, and the set of bistables 30, 31, 32 and 33 is continually reset to zero. The 0 level of the signal SCR at the output of the bistable 32 is applied to the signal SCRV after validation by the inverter I and the NOR gate 62. Test point 6B remains at 0 which corresponds to absence of excitation current control signals. The excitation current decreases for as long as the alternator phase voltage at the input 02 remains above VS1.

When the alternator phase voltage drops below VS1 due to the lack of excitation current the second sensing signal is at a low level, as shown in FIG. 5b, the bistables 30, 31, 32, 33 are no longer reset to zero and they therefore continue to change state, due to the action of the signal SCS synchronized with the alternator. Because the bistables 30 through 34 continue to change state the signal SCR at the output of the bistable 32 goes to 1. This 1 state is applied to the signal SCRV after validation by the inverter I and the NOR gate 62. The signal at test point 6B goes to 1 and causes the field coil In to be charged for as long as the alternator phase voltage remains below VS1.

The alternator phase voltage present at the regulator input 02 is therefore regulated around the threshold value VS1 as shown in the timing diagram 02A in FIG. 5b.

The clocking of the set of bistables 30, 31, 32, 33 by means of the control signal SCS synchronized to rotation of the alternator is particularly advantageous for the following reasons.

For a given alternator functioning in alternator phase voltage regulation mode the amplitude variation between two successive cycles is independent of the rotation speed of the alternator. If the regulation period is set in the excitation control circuit and the alternator rotation speed rises the number of alternator phase voltage cycles included in a regulation period is very large. The amplitude variations are consequently summed to produce very high cumulative amplitude variations with the result that alternator phase voltage regulation is out of control. It is therefore necessary to reduce the response time of the device implementing the regulation function as the alternator speed rises. This reduction in the response time is achieved by imposing a regulation period inversely proportional to the alternator rotation speed. In other words, the field coil excitation control frequency must be proportional or substantially proportional to the alternator rotation speed. The enabled synchronous timing signal SCSV applied to the bistables 30 through 33 and synchronized to the rotation of the alternator achieves this proportional relationship between the alternator phase voltage regulation frequency and the alternator rotation speed. Any increase in the alternator rotation speed increases the frequency of the enabled synchronous timing signal SCSV to the bistables 30 through 33. The bistables 30 through 33 change state faster so that the phase voltage changing to a value lower than the threshold voltage VS1 is detected faster by the change to the 1 state of the signal SCR at the output of the bistable 32.

Synchronous clocking of the bistables 30 through 33 therefore provides good control over the phase voltage amplitude when the regulator is functioning in alternator phase voltage regulation mode.

Anologous functioning can be demonstrated for the bistables 40, 41, 42 which memorize the memorized alternator phase voltage amplitude signal SPCD for sensing faults relating to this amplitude.

The inverter I receiving the signal SCR on its input and the NOR gate 62 enable the signal SCR to pass by prohibiting prolonged charging of the field coil In when the alternator phase voltage amplitude remains below the threshold value VS1, despite the action of the phase regulation device. This possibility arises in the case of a fault such as, for example, a break in the connection between the alternator and the alternator phase voltage input of the regulator.

The functioning of the plurifunction regulator in accordance with the invention as shown in FIGS. 2a and 3a will now be described with reference to FIGS. 6a and 6b in the case of a fault such as a break in the connection between the phase input 02 and the alternator. In this case, as shown in FIG. 6a, the alternator phase voltage is removed at the terminal 02 and specifically at test point 02A. The fault, corresponding to a broken (cut) connection, is denoted C. Before the occurrence of the fault C the regulator functions as a free-frequency regulator as previously described. On the occurrence of the fault C the first sensing signal PSD is removed and the synchronous control signal SCS then corresponds to the fixed-frequency signal CK. The second sensing signal DSD being also removed, the bistables 30, 31, 32, 33 are no longer reset to zero and the bistables 30 through 33 continue to change state with the result that the signal SCR at the output of the bistable 32 goes to 1. This 1 state is transmitted to the signal SCRV at test point 6B to charge the field coil In of the alternator. As the bistables 30 through 33 are not being reset to zero the signal SAEP at the output of the bistable 33 also goes to 1 (with a time-delay of 50 ms relative to the signal SCR for a clock frequency CK equal to 80 Hz). When the signal SAEP goes to 1 transmission of the clock signal CK through the AND gate 34 is prevented so that the bistables 30 through 33 are no longer clocked and the excitation control signal is stopped by forcing the signal SCRV at test point 6B to zero by means of the NOR gate 62. As seen in timing diagram 03A in FIG. 6a in the event of a fault such as a break in the connection between the phase input 02 and the alternator the regulator attempts to regulate the phase voltage by charging the field coil for 50 ms after which the excitation control signal is blocked to prevent a high and hazardous overload being applied to the battery and the vehicle circuit.

Following this removal of the field coil exitation signal and when the battery voltage Ub is lower than the nominal voltage Un only the pre-excitation signal with the cyclic ratio of ⅛ is passed by the pre-excitation circuit 8, the NOR gates 60, 61 and 63. As can be seen in FIG. 6a full-field excitation of the field coil In resulting from the presence of the fault C results in an increase in the battery voltage at the terminal 01A, the battery voltage rising above the nominal voltage of 14 Volts, and also leads to a slight increase in the voltage applied to the indicator lamp LT terminal 04 (to the test point 04A). The effect of the battery voltage returning to a value less than 14 Volts as noted at test point 01A in FIG. 6a (UB<14 Volts) and of the absence of the phase signal is, given the triggering of the comparator 24 which supplies for the third sensing signal TSD a low-level signal which no longer resets to zero the set of bistables 40, 41, 42 of the alternator phase voltage amplitude memory means 4, to switch the switching means 92 through the intermediary of the signal SPCD and the exclusive-OR gate 900A and so to turn on the indicator lamp LT, as represented in relation to the timing diagram for the signal present at test point 04A in FIG. 6a.

FIG. 6b shows timing diagrams relating to various test points in the same alternator phase voltage fault condition previously represented in relation to FIG. 6a.

FIG. 6b represents in succession the timing diagram of the signal at test point 02A relative to the cutting off at C of the alternator phase voltage and then the signal at test point 4A of the alternator phase voltage amplitude memory means 4, this diagram actually representing the third sensing signal TSD. There is then also shown the signal at test point 9A, that is to say the conditional fault presence control signal SCED supplied by the fault indication control logic circuit 90 and in particular by the NOR gate 902 in the case of FIG. 2a or FIG. 3a.

There is finally shown the signal at the indicator lamp terminal 04 (at test point 04A).

As a result of the existence of the fault caused by the aforementioned cut connection C the third sensing signal TSD is removed, the effect of which is to substitute for the pulses of the signal SCED supplied by the NOR gate 902 a signal of constant high level which only resets to zero the bistables 910 of the set of bistables if the battery voltage remains above 14 Volts. Immediately the battery voltage falls below 14 Volts the resetting to zero of the bistables of the set of bistables 910 is stopped and a time-delay $\tau$ is counted down, the effect of which is to generate the switching circuit 92 triggering signal at the end of the time-delay $\tau$ and to turn on the indicator lamp LT as the result of application to the indicator lamp terminal 04 of a low-level voltage, as shown in FIG. 6b.

Another mode of operation of the plurifunction regulator in accordance with the invention will be described with reference to FIG. 7 in the case of a different fault such as a broken connection C' between the alternator B+ terminal and the input 01, this being the terminal usually called the "sense" input in the case of the FIG. 2a or 3a circuit.

FIG. 7 shows the timing diagram relating to the alternator B+ voltage at test point 01A, the timing diagram relating to the alternator phase voltage at test point 02A, the timing diagram relating to the alternator excitation voltage at test point 03A and, of course, the timing diagram relating to the signal applied to the indicator lamp terminal 04 (test point 04A). Previous to the existence of the "sense cut-off" fault C' the voltage at test point 01A goes to a low level, the effect of which is to remove the excitation voltage which was, prior to the appearance of the fault C', regulated in free-frequency mode. The excitation current is removed at the terminal 03A and the alternator phase voltage decreases towards a value corresponding to the remanent excitation of the field coil. The indicator lamp LT, turned off previous to the appearance of the fault C', turns on almost immediately the fault C' appears because the switching circuit 92 automatically goes to a conducting state when the input 01 is no longer energized.

There has been described herein a plurifunction regulator offering particularly high performance in which faults as varied as removal of the alternator phase input, permanent full-field energization of the field coil and breaking of the connection to the "sense" terminal are indicated by the same indicator lamp. The plurifunction regulator in accordance with the invention is particularly advantageous in that it can make allowance for auxiliary circuits such as circuits for magnetizing the field coil of the alternator when the latter is not rotating.

Of course, the plurifunction regulator in accordance with the invention is particularly advantageous in that the solutions put forward enable monolithic implementation of the regulator system on a single integrated circuit substrate.

In the case of the FIG. 2b implementation the interface circuit may comprise a separate microchip located in the same external packaging as the regulator microchip proper.

The embodiments described are without prejudice to implementations using discrete component technologies which do not lie outside the scope of the present invention.

There is claimed:

1. Plurifunction regulator device for regulating the excitation voltage of an alternator for charging a battery of an automobile vehicle, comprising a battery voltage input, an alternator phase voltage input, an alternator excitation regulation output, a terminal connected to an indicator lap wired in series with an ignition switch of the vehicle, a field coil power excitation control circuit, a battery voltage sensing circuit connected to said battery voltage input to supply a signal indicating that an alternator-battery connection is broken and an excitation regulation signal related to the peak value and the average value of the battery voltage, an alternator phase voltage amplitude sensing circuit connected to said alternator phase voltage input to supply a first sensing signal relative to a first threshold value corresponding to non-memorized shaping of the alternator phase voltage input at very low alternator rotation speeds authorizing the establishing of an excitation current with a frequency and a cyclic ratio imposed by an alternator phase voltage signal applied to the alternator phase voltage input to initiate cutting in of the alternator, a second sensing signal relative to an intermediate second threshold value authorizing application of a full-field condition to the alternator during the cutting in process initiated by said first sensing signal and a third sensing signal relative to a third threshold value near a battery charge regulation voltage for sensing faults relating to an amplitude of said phase voltage input, alternator field coil excitation control and memory means to receive said second sensing signal and to supply a signal authorizing said full-field condition during cutting in of the alternator and an alternator phase voltage regulation control signal during load shaping in a circuit supplied by the alternator, timing means for said field coil excitation control and memory means synchronized to an alternator rotation speed to receive said first sensing signal and a fixed-frequency reference clock signal and to supply a timing signal synchronized to the alternator rotation speed when the alternator is rotating and to supply a fixed-frequency timing signal when the alternator is stationary, and conditional field coil excitation voltage control logic means for controlling the excitation voltage.

2. Plurifunction device according to claim 1 further comprising a pre-excitation control circuit to receive from said indicator lamp terminal a start signal in response to operation of the ignition switch of the vehicle and to supply a periodic pre-excitation signal with a cyclic ratio of $\frac{1}{2}$ corresponding to a pre-excitation condition of said field coil.

3. Regulator device according to claim 2 wherein said conditional control logic means comprise a first NOR gate to receive on respective inputs excitation enabling signals comprising said pre-excitation signal supplied by said pre-excitation circuit when said ignition switch is operated, the first alternator phase voltage amplitude sensing signal appearing at very low alternator rotation speeds and a complemented signal authorizing application of the full-field condition appearing as soon as the alternator starts rotating and normally disappearing only when the alternator stops rotating and to supply at its output an excitation enabling control signal, a second NOR gate to receive on respective inputs the excitation regulation signal related to the peak value and the average value of the battery voltage and the excitation enabling control signal supplied by said first NOR gate, said second NOR gate supplying at its output a conditional excitation signal conditioned by the voltage measured at the battery and corresponding to a complemented excitation regulation signal when the excitation enabling control signal is at a low level, a third NOR gate to receive on respective inputs a complemented alternator phase regulation control signal and the signal authorizing application of the full-field condition to the field coil and to supply at its output an enabled alternator phase voltage regulation control signal which is limited temporally by a change in the level of the signal authorizing application of the full-field condition to prevent further alternator phase voltage regulation in the event of a fault in the alternator phase voltage amplitude sensing circuit, and a fourth NOR gate to receive on respective inputs said conditional excitation signal supplied by said second NOR gate and said enabled phase voltage regulation conditional control signal and to supply at its output to the field coil power excitation control circuit a resultant normal excitation control signal.

4. Plurifunction device according to claim 1 further comprising alternator fault indication means.

5. Plurifunction device according to claim 1 further comprising an excitation sensing circuit to supply a signal indicating the presence of alternator excitation.

6. Plurifunction device according to claim 1 further comprising alternator phase voltage amplitude memory means timed by said timing means to receive said third sensing signal and to supply a memorized alternator phase voltage amplitude signal for sensing faults relating to said amplitude.

7. Plurifunction device according to claim 4 further comprising an excitation sensing circuit to supply a signal indicating the presence of alternator excitation and alternator phase voltage amplitude memory means timed by said timing means to receive said third sensing signal and to supply a memorized alternator phase voltage amplitude signal for sensing faults relating to said amplitude, wherein said alternator fault indication means comprise an alternator fault indication control logic circuit to derive a battery charge fault conditional presence control signal from the excitation regulation signal related to the average value and the peak value of the battery voltage, the memorized alternator phase voltage amplitude signal supplied by the alternator phase voltage amplitude memory means and the signal supplied by said excitation sensing circuit, a time-delay circuit to receive said alternator fault conditional presence control signal supplied by said indication control logic circuit and supply an alternator fault actual presence signal and a switching circuit to receive said alternator fault actual presence signal and to energize selectively said indicator lamp terminal to turn said indicator lamp on and off.

8. Plurifunction device according to claim 7 wherein said fault indication control logic circuit responds to said fault conditional presence signal being present for longer than the time-delay of said time-delay circuit by turning on said indicator lamp selectively depending on the battery voltage and the value of said signal indicating presence of a field coil excitation current wherein Ex represents the presence of said excitation current, $\overline{EX}$ represents the absence of said excitation current, Un represents a nominal battery voltage, UB represents an actual battery voltage, the value LT=1 represents presence of a battery charge fault (and that the indicator lamp is turned on) and the value LT=0 represents absence of any battery charge fault (and that the indicator lamp is turned off) and if $\overline{EX}=1$ and UB<Un then LT=1, if $\overline{EX}=1$ and UB>Un then LT=0, if EX=1 and UB<Un then LT=0 and if EX=1 and Ub>Un then LT=1.

9. Plurifunction device according to claim 8 wherein said fault indication control logic circuit comprises a first exclusive-OR gate to receive on a first input the regulation signal related to the peak value and the average value of the battery voltage and on a second input said memorized alternator phase voltage amplitude signal and to supply at its output a first conditional fault presence signal, a second exclusive-OR gate to receive on a first input the regulation signal related to the peak value and the average value of the battery voltage and on a second input said signal indicating presence of field coil excitation and to supply at its output a second conditional fault presence signal, and a NOR gate receive on respective inputs said first and second conditional fault presence signals and to supply at its output said resultant battery charge fault conditional presence signal.

10. Plurification device according to claim 1 further comprising an alternator magnetization circuit to operate in response to application of voltage to the plurification device and to supply a magnetization control signal to said control logic means to command the establishing of an excitation current in said field coil immediately such that voltage is applied to the regulator and for a sufficient time to magnetize a magnetic circuit of the alternator when the alternator is stationary.

11. Regulator device according to claim 10 wherein a complemented signal authorizing application of the full-field condition to said field coil inhibits said magnetization circuit immediately after the alternator starts rotating.

12. Regulator device according to claim 10 wherein a fourth NOR gate of said control logic means has an input to receive said magnetization control signal.

13. Plurification device according to claim 7 wherein said fault indication control logic circuit responds to the presence of said fault conditional presence control signal for longer than the time-delay of said time-delay circuit by commanding a fault indication by turning on said indicator lamp depending on the battery voltage and the alternator phase voltage wherein Vs2 represents an alternator phase voltage amplitude sensing threshold voltage, Up represents an alternator phase voltage, Un represents a nominal battery voltage, UB represents actual battery voltage, the value LT=1 represents the presence of a battery charge fault (and that the indicator lamp is turned on) and the value LT=0 represents the absence of any battery charge fault (and that the indicator lamp is turned off) and if Up<Vs2 and UB<Un then LT=1, if Up<Vs2 and UB>Un then LT=0, if Up>Vs2 and UB<Un then LT=0 and if Up>Vs2 and Ub>Un then LT=1.

14. Plurification device according to claim 7 further comprising an alternator magnetization circuit to operate in response to application of voltage to the plurification device and to supply a magnetization control signal to said control logic means to command the establishing of an excitation current in said field coil wherein voltage is applied to the plurification device and for sufficient time to magnetize a magnetic circuit of the alternator when the alternator is stationary, wherein said fault indication control logic circuit comprises an exclusive-OR gate to receive on a first input the excitation regulation signal related to the peak value and the average value of the battery voltage and on a second input said memorized alternator phase voltage amplitude signal and to supply at its output a first conditional fault presence signal, a first NOR gate to receive on a first input a complemented excitation regulation signal related to the peak value and the average value of the battery voltage and on a second input the signal indicating presence of field coil excitation and on a third input the magnetization control signal and to supply at its output a second conditional fault presence signal enabled by absence of magnetization, and a second NOR gate to receive on respective inputs said first and second conditional fault presence signals and to supply at its output said resultant battery charge fault conditional presence signal.

15. Plurifunction device according to claim 7 wherein said switching circuit comprises a power stage, a diode connecting said power stage to said indicator lamp terminal to enable an auxiliary load to be supplied therefrom and a fault indication control stage connected to said indicator lamp terminal and to apply thereto a potential near the ground potential when a fault is present.

16. Regulator device according to claim 1 wherein said timing means and memory means synchronized to the alternator rotation speed comprise an exclusive-OR gate to receive on a first input a fixed-frequency reference clock signal and on a second input said first sensing signal corresponding to non-memorized shaping of the alternator phase signal at very low alternator rotation speeds and to supply at its output to said field coil full-field excitation control and memory means and to said alternator phase voltage amplitude memory means a timing signal synchronized to the alternator rotation speed.

17. Plurification device according to claim 7 wherein said field coil excitation control and memory means and said alternator phase voltage amplitude memory means comprise respective series of four and three JK bistable flip-flops connected in cascade with the reset to zero inputs of the respective series of bistable flip-flops to receive the second and third sensing signals, and a NAND gate to receive on a first input said timing signal synchronized to the alternator rotation speed and on a second input a complemented output signal from the final bistable of the corresponding series and supply at an output to the timing inputs of said bistable flip-flops of the corresponding series said enabled synchronized timing signal.

18. Regulator device according to claim 1 wherein said alternator phase voltage amplitude sensing circuit comprises a resistor-capacitor filter circuit including a clipping diode for supplying from the alternator phase voltage input a filtered alternator phase voltage signal, said diode clipping spurious overvoltages on a capacitor for storing the maximum value of the alternator phase voltage amplitude, an alignment circuit to receive said filtered alternator phase voltage signal and to supply an aligned filtered alternator phase voltage signal with its negative peaks aligned with the ground potential of the device, a first voltage comparator to receive on a positive first input a first reference voltage and on a negative second input said aligned filtered alternator phase voltage signal and to supply at its output said first sensing signal, a second voltage comparator to receive on a negative first input a second reference voltage and on a positive second input said aligned filtered alternator phase voltage signal and to supply at its output said second sensing signal, and a third voltage comparator to receive on a negative first input a third reference voltage and on a positive second input said aligned filtered alternator phase voltage signal and to supply at its output said third sensing signal.

19. Regulator device according to claim 18 wherein said second reference voltage is greater than the peak value of said spurious overvoltages applied to the second input of the second comparator when the alternator is not rotating, whereby it is possible to distinguish between such spurious overvoltages and the alternator phase signal.

20. Plurification device according to claim 18 wherein said third reference voltage is greater than the peak value of the alternator phase voltage applied to the second input of the third comparator when the alternator phase voltage is obtained in the absence of an excitation current only by virtue of a remanence of a magnetic circuit when the alternator rotation speed is maximal.

21. Plurifunction device according to claim 18 wherein said reference voltages are produced by a temperature-stabilized reference voltage generator and a potentiometer divider connected to the output of said reference voltage generator.

22. Plurifunction regulator device according to claim 1 wherein said battery voltage sensing circuit comprises a circuit for sensing and memorizing the peak value of rectified voltage applied to the battery, a first comparator to receive on a positive terminal a threshold value representing a battery charge set point voltage and on a negative terminal a filtered alternator signal, a discharge circuit comprising a first switching transistor with its base connected to the output of said first comparator, a resistor-capacitor time-delay circuit imposing a maximum regulation frequency, a first capacitor of said resistor-capacitor circuit being connected between the collector and the emitter of said first transistor constituting a capacitor discharge circuit and a first resistor of said resistor-capacitor circuit constituting a charging resistor for said first capacitor, a double-threshold second comparator with a negative terminal connected directly to a common point of the first resistor and the first capacitor of said resistor-capacitor circuit and a positive terminal connected to an intermediate point of a divider bridge and an output connected in a feedback loop to said intermediate point through a second resistor, and a third comparator to receive on a positive terminal a threshold value representative of a peak alternator voltage that is not be exceeded and on a negative terminal an envelope signal of the alternator voltage peak value supplied by an output terminal of the sensing circuit, the output of said third comparator being connected to the base of said switching transistor.

23. Plurifunction regulator device according to claim 22 wherein to enable monolithic integrated circuit implementation on a single semiconductor material substrate said peak value memory circuit comprises a second transistor, a second capacitor constituting a peak value envelope memory circuit connected to the emitter of the second transistor through a third resistor and to receive a regulator reference voltage, and a third transistor for compensating the emitter-base junction voltage introduced during charging by the second transistor while the second capacitor is being discharged.

* * * * *

UNITED STATES PATENT AND TRADEMARK OFFICE
CERTIFICATE OF CORRECTION

PATENT NO.   :   5,079,496

DATED        :   01/07/92

INVENTOR(S)  :   Pierret et al.

It is certified that error appears in the above-identified patent and that said Letters Patent is hereby corrected as shown below:

| | | |
|---|---|---|
| col. 15, line 26 | delete "supplied" | insert --supplies-- |
| col. 15, line 38 | delete "is" | insert --if-- |
| col. 25, line 18 | after "and" | insert --to-- |

Signed and Sealed this

Second Day of November, 1993

*Attest:*

BRUCE LEHMAN

*Attesting Officer*   Commissioner of Patents and Trademarks